(12) United States Patent
Roy et al.

(10) Patent No.: US 10,800,338 B2
(45) Date of Patent: Oct. 13, 2020

(54) STORAGE CONTAINER FOR A VEHICLE

(71) Applicant: BOMBARDIER RECREATIONAL PRODUCTS INC., Valcourt (CA)

(72) Inventors: Nicolas Roy, Richelieu (CA); Dany Bernier, Sherbrooke (CA); Didier Dubois, Sherbrooke (CA); Jean-Philippe Crepeau, Bromont (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 16/523,364

(22) Filed: Jul. 26, 2019

(65) Prior Publication Data

US 2019/0344722 A1 Nov. 14, 2019

Related U.S. Application Data

(62) Division of application No. 15/749,247, filed as application No. PCT/IB2015/057217 on Sep. 18, 2015, now Pat. No. 10,406,986.

(60) Provisional application No. 62/199,641, filed on Jul. 31, 2015.

(51) Int. Cl.
*B60R 7/04* (2006.01)

(52) U.S. Cl.
CPC ........... *B60R 7/043* (2013.01); *B60Y 2200/20* (2013.01)

(58) Field of Classification Search
CPC ........ B60R 7/04; B60R 7/043; B60Y 2200/20
See application file for complete search history.

(56) References Cited

U.S. PATENT DOCUMENTS

| 4,256,340 | A | | 3/1981 | Dunchock | |
| 4,728,017 | A | * | 3/1988 | Mullican | B60R 9/00 224/328 |
| 4,796,791 | A | | 1/1989 | Goss et al. | |
| 6,824,029 | B2 | * | 11/2004 | Tuel, Jr. | F41C 33/06 220/532 |
| 7,121,606 | B2 | * | 10/2006 | Khan | B60R 7/043 296/37.15 |
| 7,128,341 | B1 | | 10/2006 | Dahl et al. | |
| 8,640,814 | B2 | | 2/2014 | Deckard et al. | |
| 8,800,799 | B1 | * | 8/2014 | Hawker | B65D 7/06 109/51 |
| 9,561,754 | B2 | | 2/2017 | Yamamoto | |

(Continued)

FOREIGN PATENT DOCUMENTS

| CN | 1833915 A | 9/2006 |
| CN | 102666191 B | 11/2014 |

(Continued)

OTHER PUBLICATIONS

Search Report received from the Russian Patent Office in connection with correponding Patent Application No. 2018107252, dated Apr. 10, 2019.

(Continued)

*Primary Examiner* — Gregory A Blankenship
(74) *Attorney, Agent, or Firm* — BCF LLP

(57) ABSTRACT

A storage container has a storage container body and a clip. The storage container body has a bottom surface and at least one side wall. The bottom surface defines a recess. A clip is connected to the at least one side wall. The clip defines a passage having an opened end. The opened end faces toward a bottom of the container body.

7 Claims, 25 Drawing Sheets

(56) References Cited

U.S. PATENT DOCUMENTS

| | | | |
|---|---|---|---|
| 9,776,573 B2 | 10/2017 | Wiley | |
| 10,406,986 B2* | 9/2019 | Roy | B60R 7/043 |
| 2004/0149791 A1* | 8/2004 | Tuel, Jr. | B60R 7/043 |
| | | | 224/275 |
| 2009/0115229 A1* | 5/2009 | Messner | A47C 7/62 |
| | | | 297/188.1 |
| 2014/0225403 A1 | 8/2014 | Shimada et al. | |
| 2015/0041237 A1 | 2/2015 | Nadeau et al. | |
| 2017/0197553 A1 | 7/2017 | Loera et al. | |
| 2018/0222395 A1* | 8/2018 | Roy | B60R 7/043 |
| 2019/0111849 A1* | 4/2019 | Besley | B60R 7/04 |

FOREIGN PATENT DOCUMENTS

| | | |
|---|---|---|
| RU | 2100225 C1 | 12/1997 |
| RU | 2248895 C1 | 3/2005 |
| WO | 2013116459 A1 | 8/2013 |
| WO | 2015114605 A1 | 8/2015 |

OTHER PUBLICATIONS

English translation of RU2100225C1 retrieved from http://translationportal.epo.org/ on May 7, 2019.

English translation of RU2248895C1 retrieved from http://translationportal.epo.org/ on May 7, 2019.

International Search Report of PCT/IB2015/057217; Lee W. Young; dated Feb. 4, 2016.

Office Action issued from the Chinese Patent Office dated Aug. 3, 2020 in connection with the corresponding application No. 201580083532.9 and including Search Report.

English translation of CN1833915A retrieved from https://patents.google.com/patent/CN1833915A/en?oq=CN1833915 dated Sep. 9, 2020.

English translation of CN102666191B retrieved from https://patents.google.com/patent/CN102666191B/en?oq=CN102666191 dated Sep. 9, 2020.

* cited by examiner

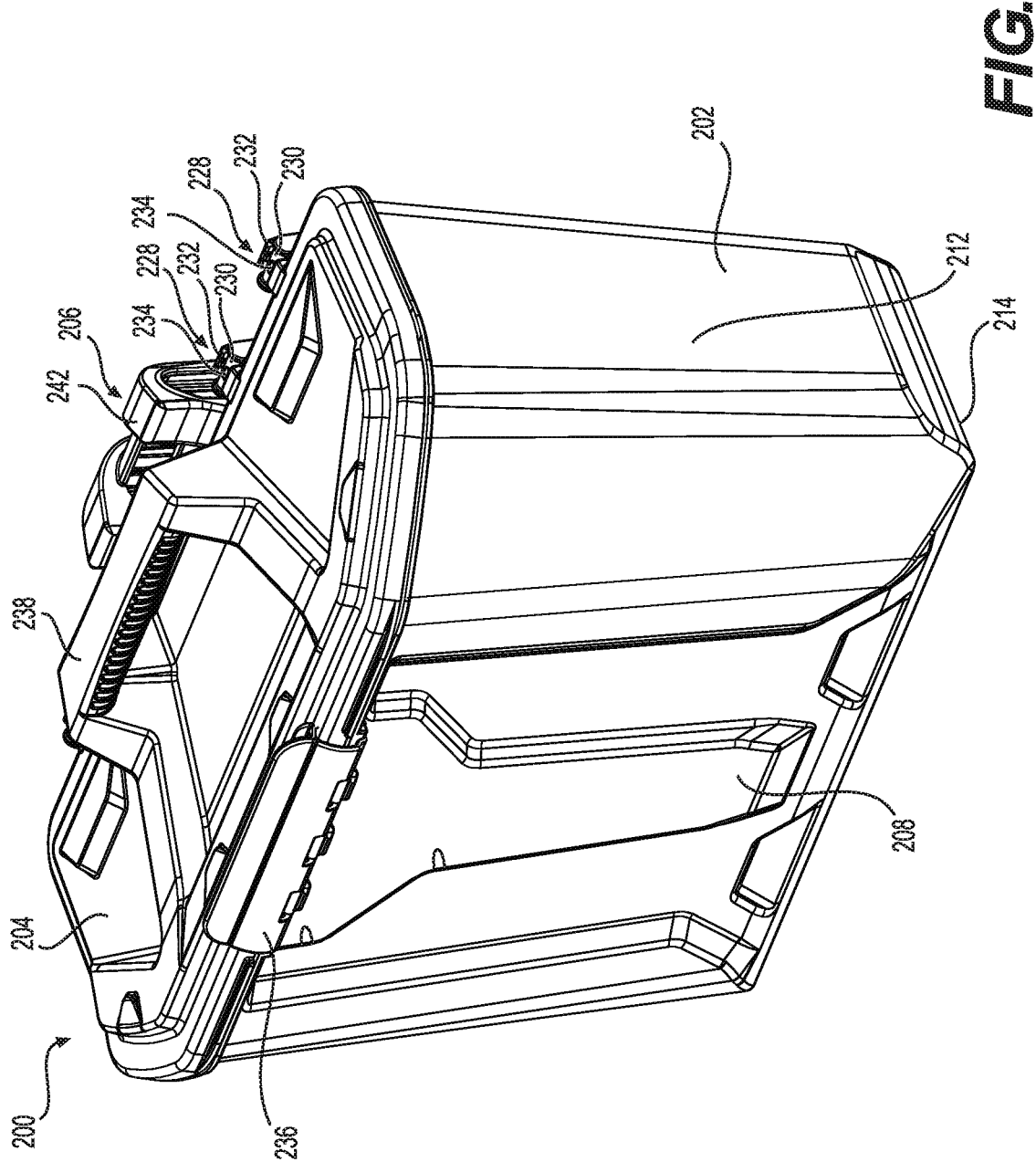

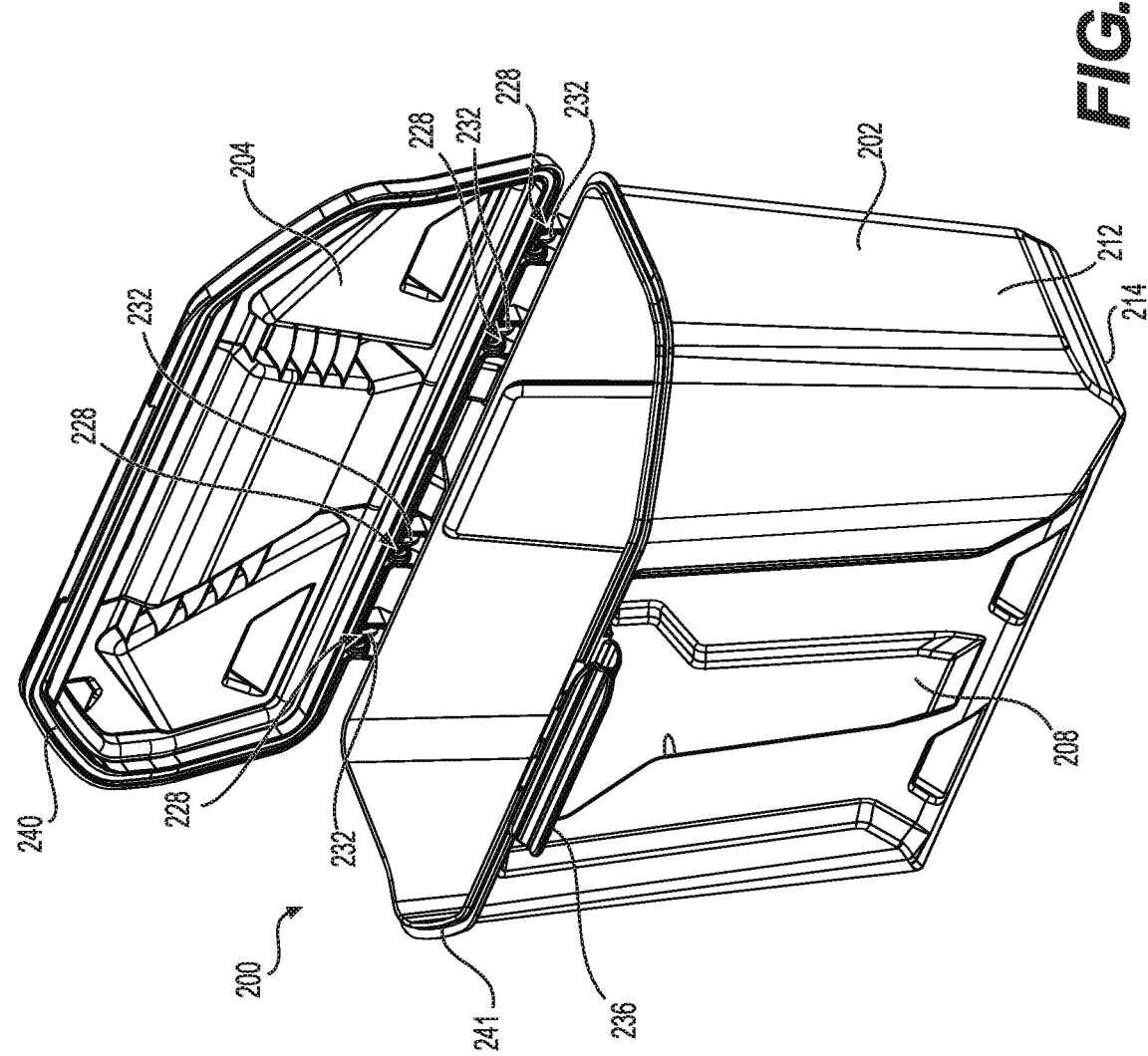

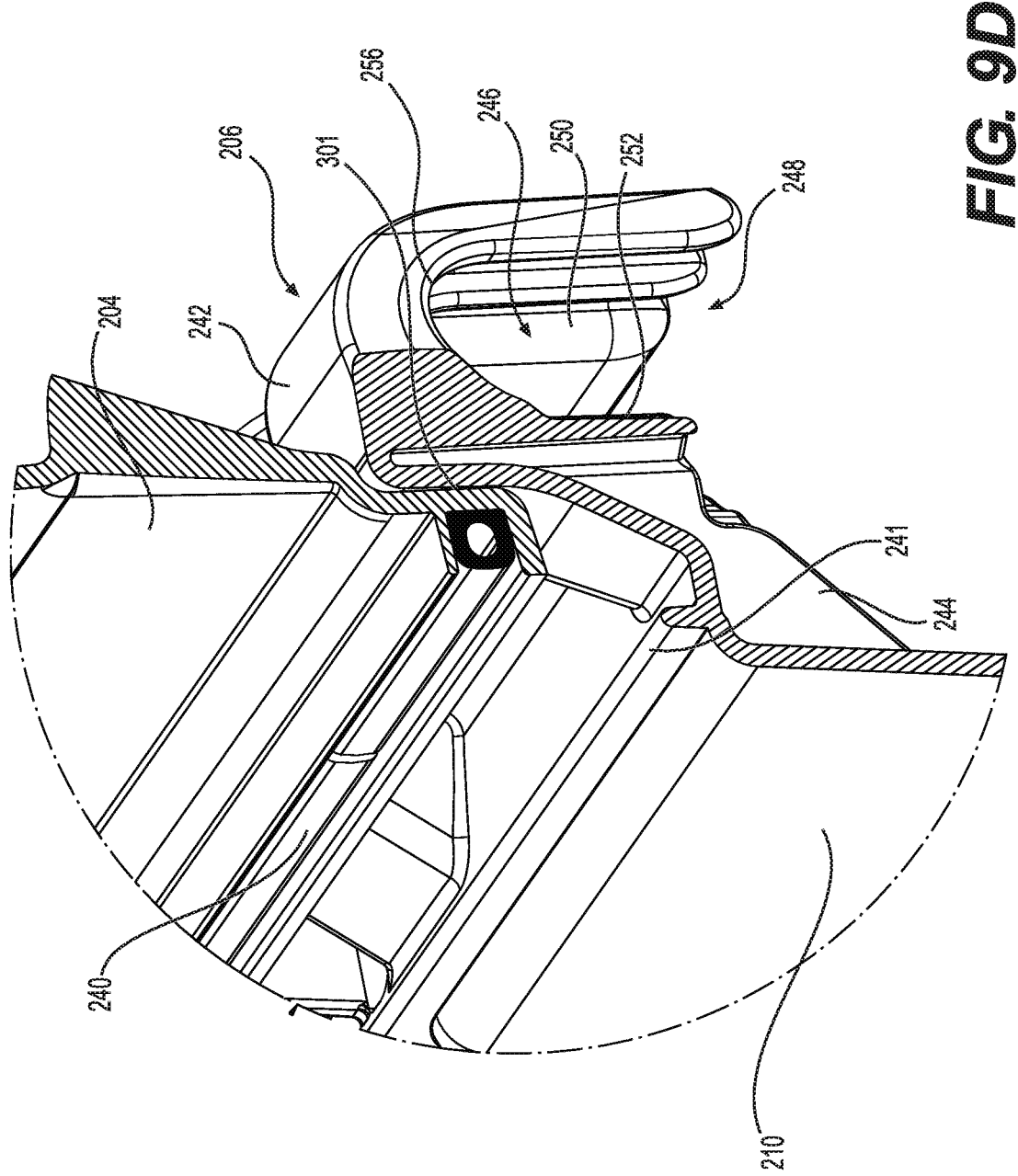

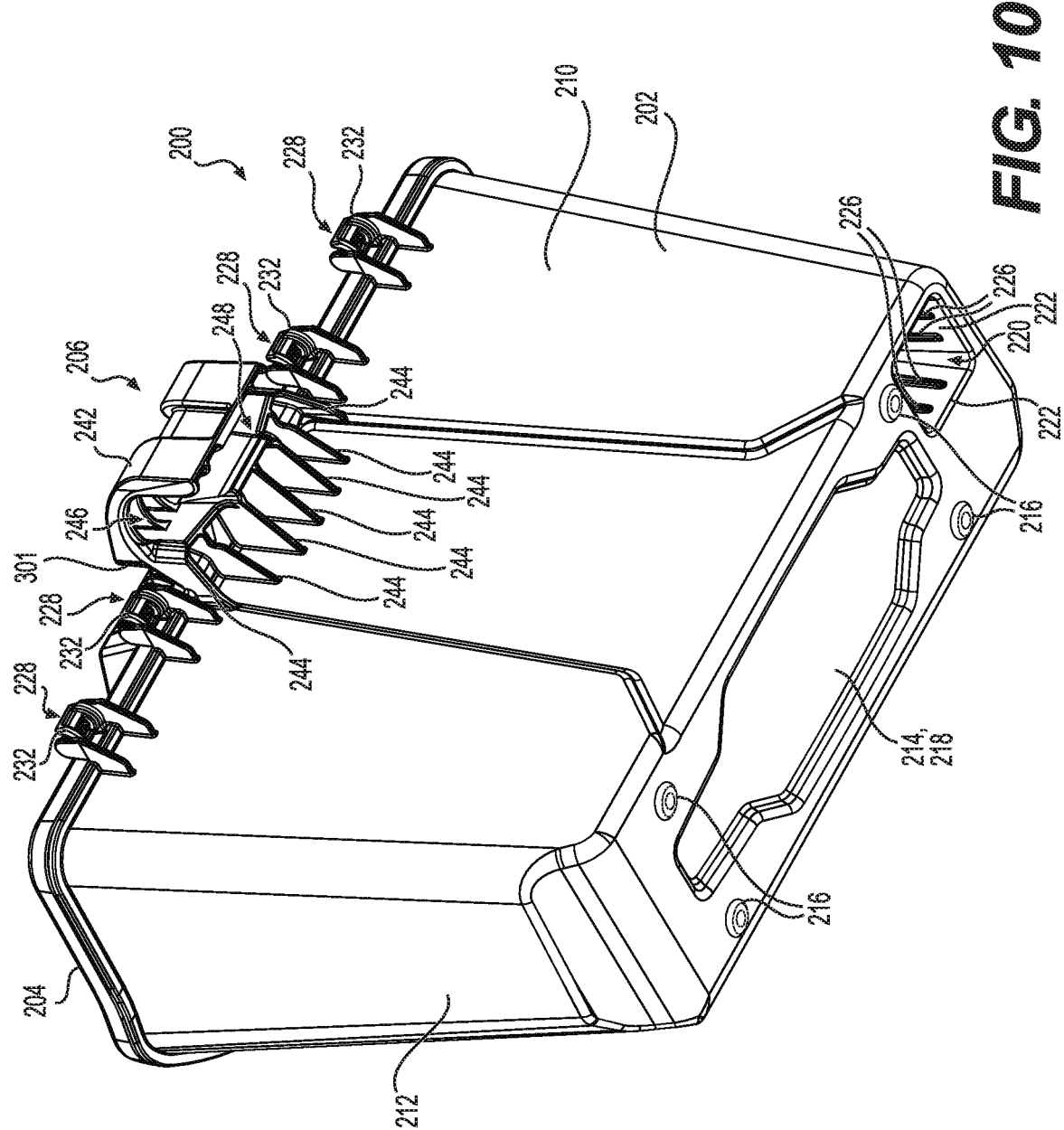

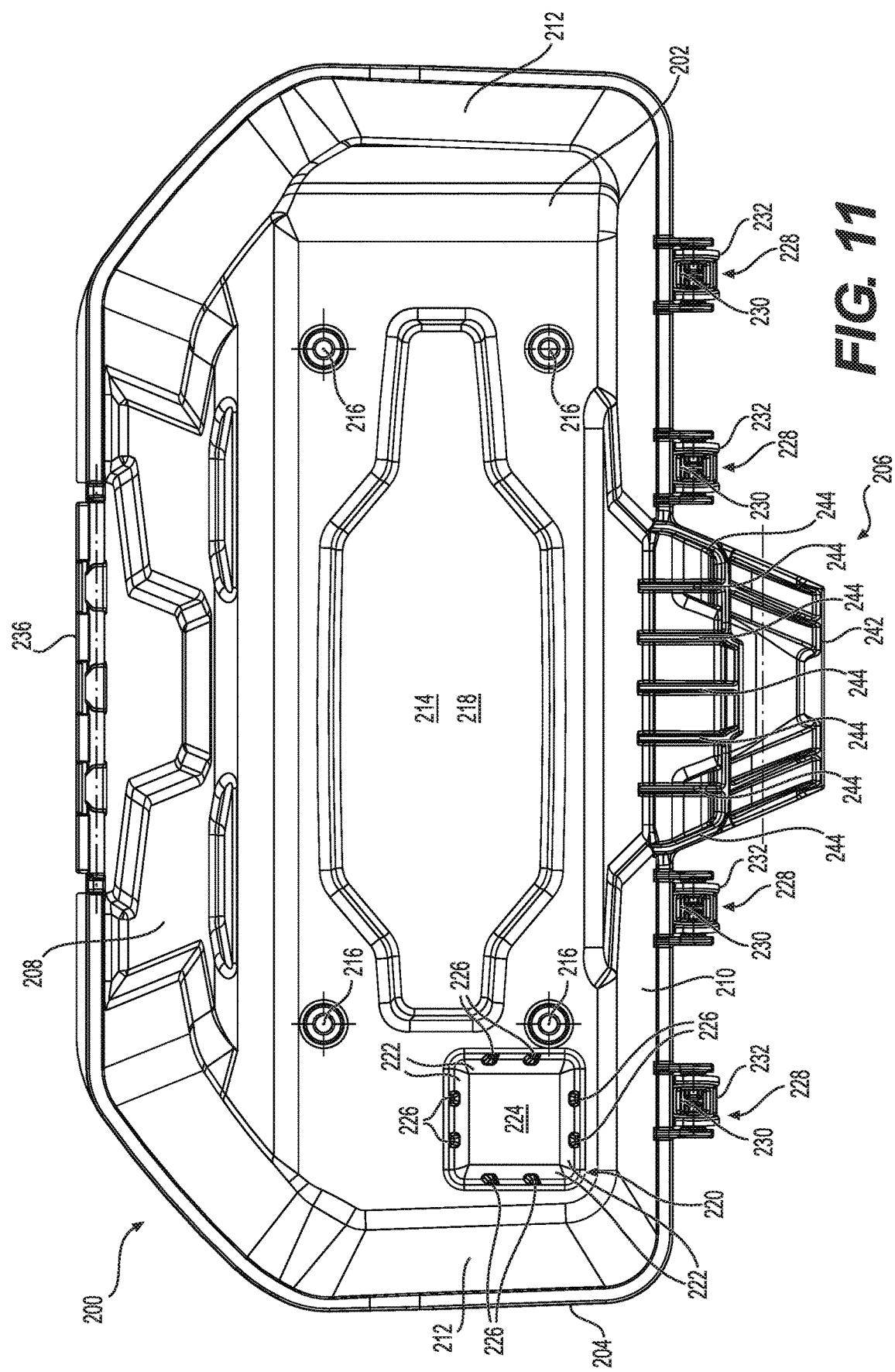

STORAGE CONTAINER FOR A VEHICLE

CROSS-REFERENCE

The present application is a division of U.S. patent application Ser. No. 15/749,247, filed Jan. 31, 2018, which a national phase entry of International Patent Application No. PCT/IB2015/057217, filed Sep. 18, 2015, which claims priority to U.S. Provisional Patent Application No. 62/199,641, filed Jul. 31, 2015, the entirety of all of which is incorporated herein by reference.

FIELD OF TECHNOLOGY

The present technology relates to storage containers for vehicles.

BACKGROUND

Side-by-side vehicles (SSVs) are off-road vehicles used for recreation and utility purposes. SSVs generally have an open cockpit area with side-by-side seating for a driver and a passenger. Although some SSVs are provided with a cargo box at the rear of the vehicle, the space available for storage in the vehicle is limited.

One solution consists in adding racks and/or rails on a hood or a roll cage of a SSV to provide a location where bags and/or storage containers can be attached. However, these add weight and increase the dimensions of the vehicle, especially when the bags and/or storage containers are attached to the racks.

It is therefore a desire to provide storage capacity for these vehicles without significantly adding to the size and/or weight of the vehicle.

SUMMARY

It is an object of the present technology to ameliorate at least some of the inconveniences present in the prior art.

According to one aspect of the present technology, there is provided a vehicle having a frame, a seat connected to the frame, a member connected to the frame, a storage container receiving surface connected to the frame, a protrusion protruding from the storage container receiving surface, and a storage container selectively disposed on the storage container receiving surface. The storage container has a storage container body having a bottom surface and a clip. The bottom surface defines a recess. The protrusion is selectively received in the recess. The clip is connected to the storage container body. The member is selectively received in the clip. The storage container is selectively removable from the vehicle.

In some embodiments of the present technology, the seat is disposed in a cockpit area of the vehicle, the storage container receiving surface is a cockpit floor, the seat has a seat base, and the storage container is disposed on the cockpit floor under the seat base.

In some embodiments of the present technology, the seat base is pivotable between a seating position and a storage position. In the seating position, the seat base extends over the storage container and prevents removal of the storage container from the vehicle. In the storage position, the seat base is positioned such that the storage container can be lifted and removed from the vehicle.

In some embodiments of the present technology, the seat base is connected to the member.

In some embodiments of the present technology, the storage container also has a lid connected to the container body. The lid is movable between an open position permitting access to an interior of the storage container and a closed position preventing access to the interior of the storage container.

In some embodiments of the present technology, the clip is connected to an upper portion of a side wall of the storage container body.

In some embodiments of the present technology, the protrusion has a first height, a passage defined by the clip to receive the member therein has a second height, and the first height is greater than the second height.

In some embodiments of the present technology, the clip defines a passage to receive the member therein. A diameter of the member in the vertical direction is less than a height of the passage.

In some embodiments of the present technology, the clip defines a passage to receive the member therein. An opened end of the passage faces toward a bottom of the container body. The passage tapers toward the opened end thereof.

In some embodiments of the present technology, the open end of the passage is smaller than a diameter of the member such that the clip deforms when the member is inserted in the clip.

In some embodiments of the present technology, the recess is eccentrically located in the bottom surface of the container body.

According to another aspect of the present technology, there is provided a storage container having a storage container body and a clip. The storage container body has a bottom surface and at least one side wall. The bottom surface defines a recess. The clip is connected to the at least one side wall. The clip defines a passage having an opened end. The opened end faces toward a bottom of the container body.

In some embodiments of the present technology, a lid is connected to the container body. The lid is movable between an open position permitting access to an interior of the storage container and a closed position preventing access to the interior of the storage container.

In some embodiments of the present technology, a handle is connected to the lid.

In some embodiments of the present technology, the clip is connected to an upper portion of the at least one side wall.

In some embodiments of the present technology, the recess has a first height, the passage has a second height, and the first height is greater than the second height.

In some embodiments of the present technology, the passage tapers toward the opened end thereof.

In some embodiments of the present technology, the clip is deformable.

In some embodiments of the present technology, the recess is eccentrically located in the bottom surface of the container body.

For purposes of the present application, terms related to spatial orientation such as forward, rearward, front, rear, upper, lower, left, and right, are as they would normally be understood by a driver of the vehicle sitting thereon in a normal driving position with the vehicle being upright and steered in a straight ahead direction. When terms related to spatial orientation are applied to individual components of the vehicle, such as a container for example, these terms are as they would be understood by a driver of the vehicle sitting thereon in a normal driving position with the vehicle being upright and steered in a straight ahead direction with the individual component mounted to the vehicle as illustrated and/or described. Should there be discrepancies between the definition of a term in the present application and the definition of this term in a document incorporated herein by reference, the definition of this term in the present application takes precedence.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 9A is a perspective view taken from a front, left side of a storage container of the vehicle of FIG. 1 with a lid of the storage container closed;

FIG. 9B is a perspective view taken from a front, left side of the storage container of FIG. 9A with the lid partially open;

FIG. 9D is a close-up view of section 9D-9D of FIG. 9C;

FIG. 10 is a perspective view taken from a rear, left side of the storage container of FIG. 9A;

FIG. 11 is a bottom plan view of the container of FIG. 9A;

DETAILED DESCRIPTION

The present technology will be described herein with respect to a side-by-side vehicle 10. However, it is contemplated that aspects of the present technology could be used in other vehicles.

Figure 1:
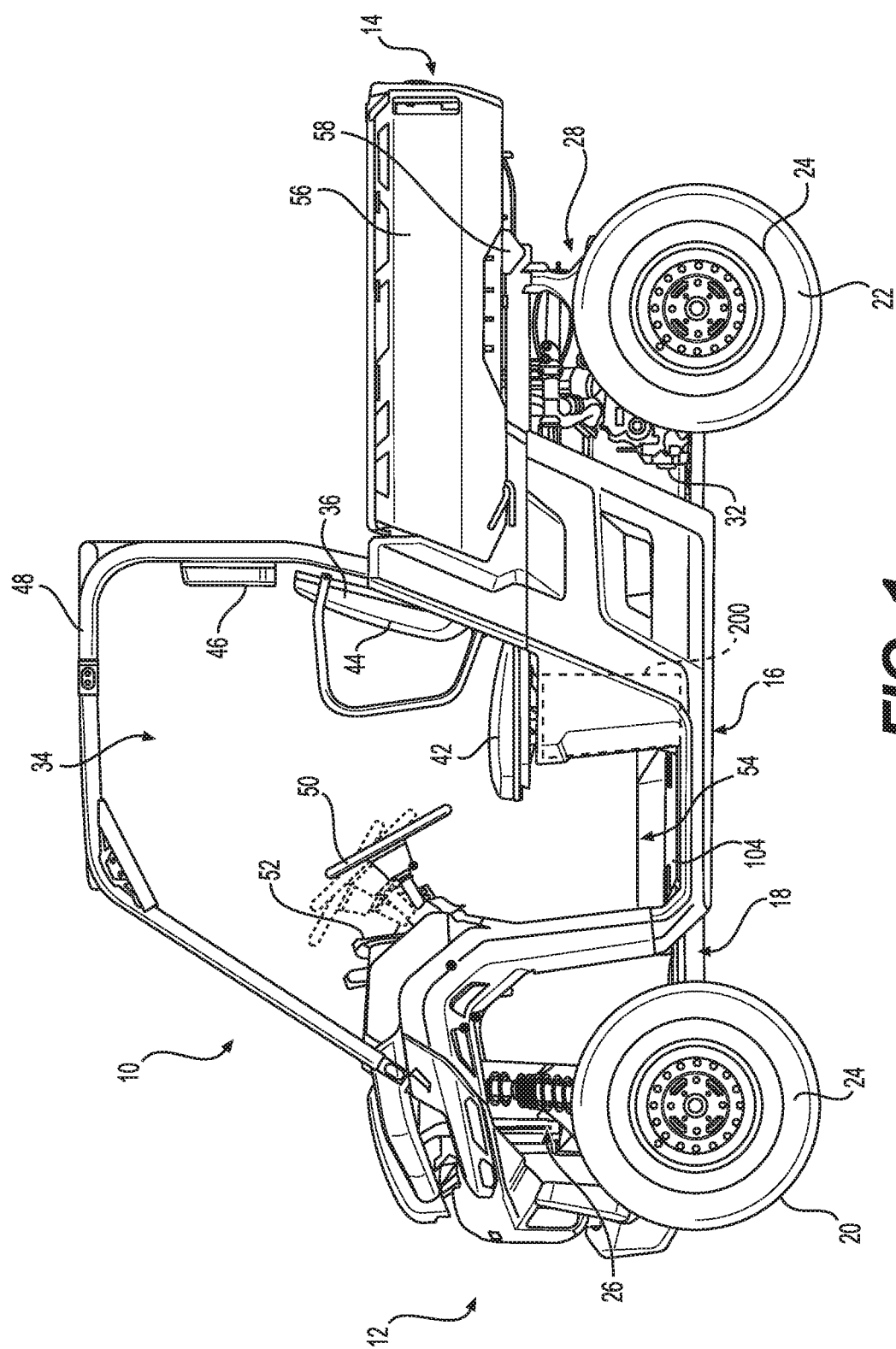
FIG. 1 is a left side elevation view of a side-by-side vehicle.
Figure 22:
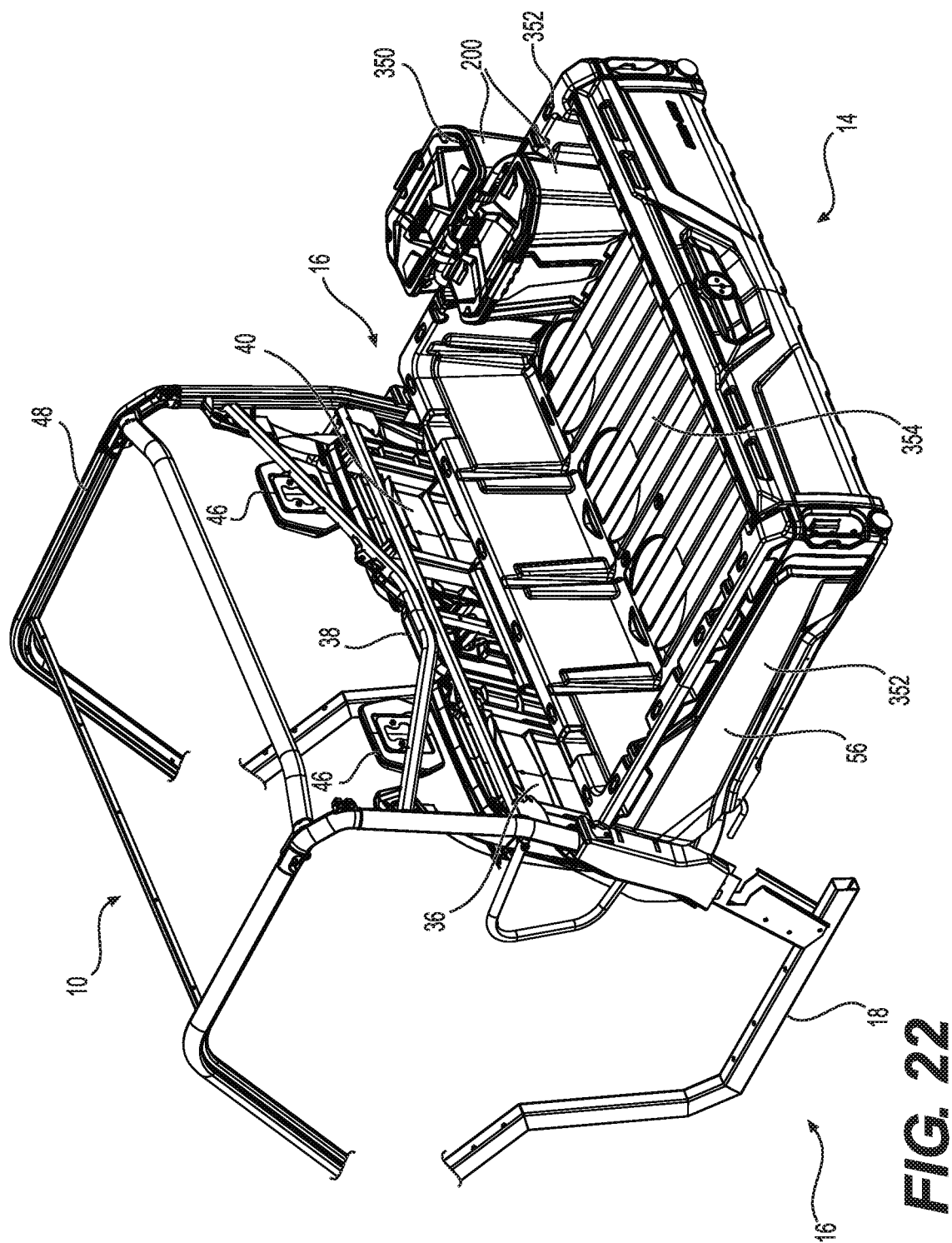
FIG. 22 is a perspective view taken from a rear, left side of a portion of the vehicle of FIG. 1 with two storage containers installed on the cargo box.

FIGS. 1 and 22 illustrates the vehicle 10 having a front end 12, a rear end 14, and left and right sides 16, defined consistently with the forward travel direction of the vehicle 10. The vehicle 10 includes a frame 18 to which the other parts of the vehicle 10 are connected.

The vehicle 10 includes a pair of front wheels 20 and a pair of rear wheels 22 (only the left wheels 20, 22 being shown). Each of the wheels 20, 22 has a tire 24. Each front wheel 20 is suspended from the front portion of the frame 18 via a front suspension assembly 26. Each rear wheel 22 is suspended from the rear portion of the frame 18 via a rear suspension assembly 28.

Figure 2:
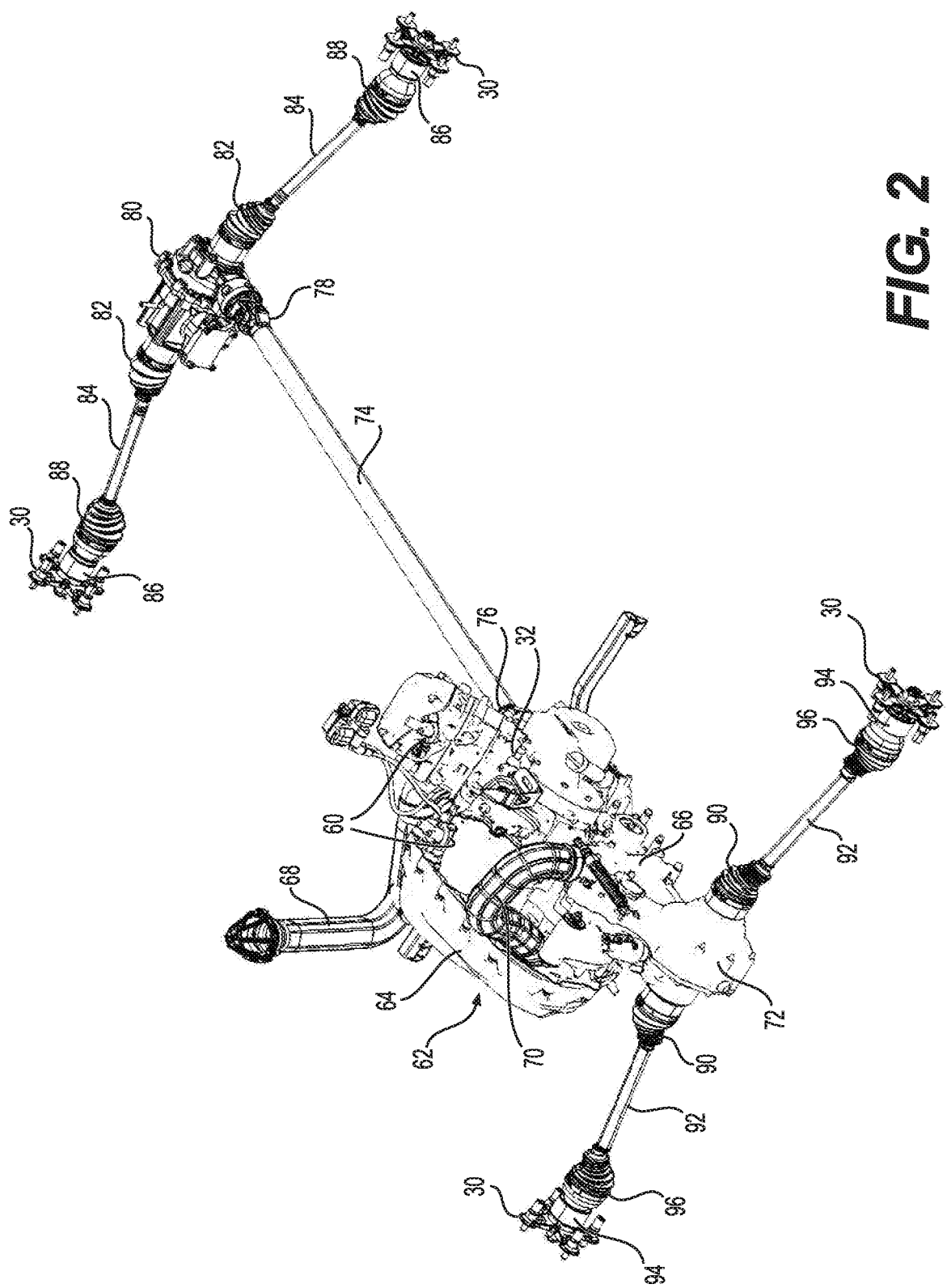
FIG. 2 is a perspective view taken from a rear, right side of a powertrain of the vehicle of FIG. 1.

Each of the wheels 20, 22 is mounted to a hub 30 (see FIG. 2). Each of the wheels 20, 22 is provided with a disc brake assembly (not shown). The disc brake assemblies are actuated by a brake pedal (not shown). The front and rear wheels 20, 22 are connected to an engine 32 (FIG. 2) as will be described in greater detail below.

The vehicle 10 has an open-air cockpit area 34 disposed generally in the middle portion of the vehicle 10. A left driver seat 36 to accommodate a driver of the vehicle 10, a middle passenger seat 38 to accommodate a passenger, and a right passenger seat 10 to accommodate another passenger (see FIG. 22) are disposed in the cockpit area 34. It is contemplated that the vehicle 10 could have only the left driver seat 36 and the right passenger seat 40. As the left driver seat 36, the middle passenger seat 38 and the right passenger seat 40 are distributed laterally, the vehicle 10 is referred to as a side-by-side vehicle, or SSV. Each seat 36, 38, 40 has a seat base 42 and a seat back 44. The left driver seat 36 and the right passenger seat 40 also have a headrest 46. The seat bases 42 of the middle passenger seat 38 and the right passenger seat 40 can be tilted up as will be described in greater detail below. The seat base of the left driver seat 36 is fixed, but it is contemplated that it could also be tilted up. A roll cage 48, connected to the frame 18, is disposed over the cockpit area 34.

Figure 3:
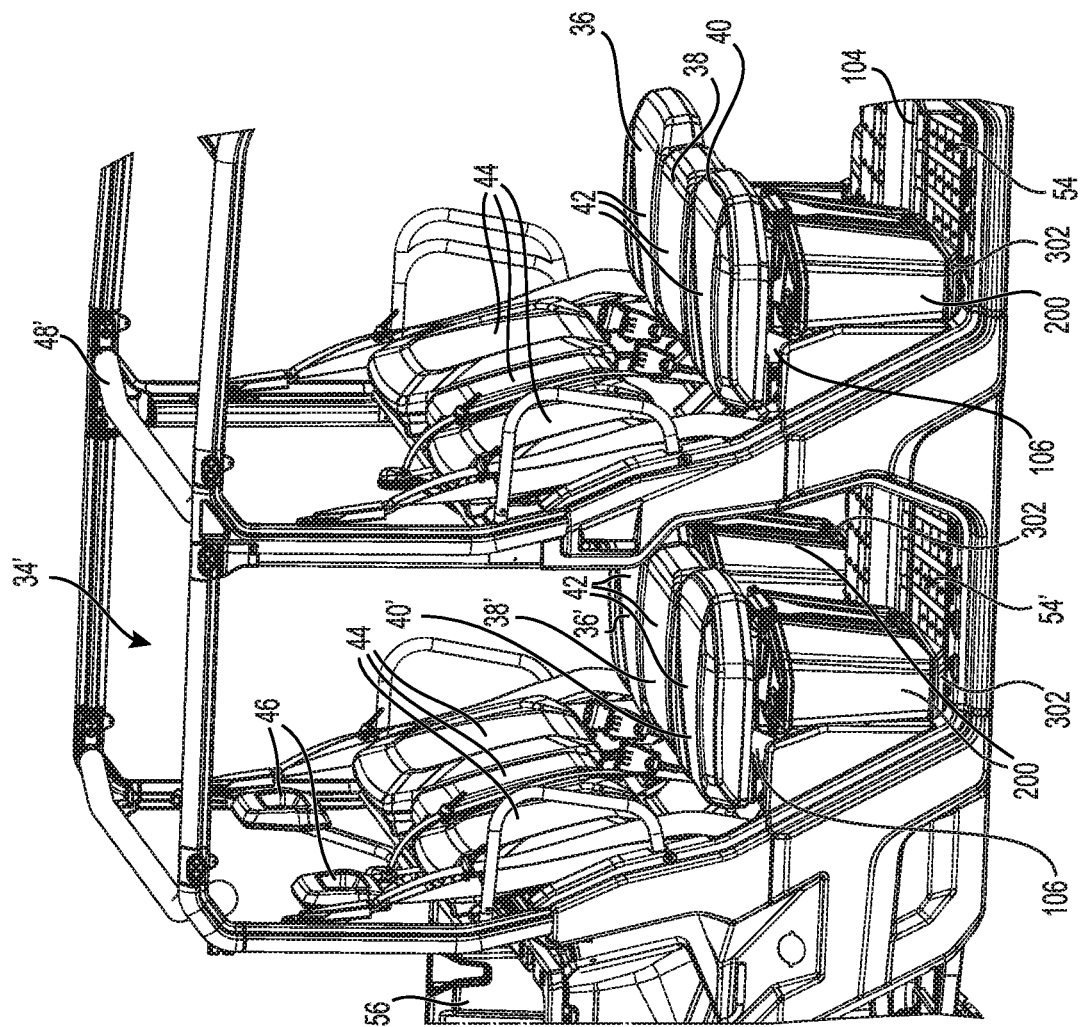
FIG. 3 is a perspective view taken from a front, right side of a central portion of an alternative embodiment of the side-by-side vehicle having two rows of seats.

In an alternative embodiment of the vehicle 10, the vehicle 10 has two rows of seats. As can be seen in FIG. 3, in this alternative embodiment the cockpit area 34' is longer than the cockpit area 34 described above in order to accommodate both rows of seats. The front row of seats has a front driver seat 36 and middle and right passenger seats 38, 40 similar to the seats 36, 38, 40 described above. The rear row of seats has a rear left passenger seat 36', a rear middle passenger seat 38' and a rear right passenger seat 40'. The seat bases 42 of the rear left passenger seat 36', the rear middle passenger seat 38' and the rear right passenger seat 40' can also be tilted up. A roll cage 48' adapted to the longer cockpit area 34' is connected to the frame 18. It is contemplated that other alternative embodiments of the vehicle 10 could have more than two rows of seats.

Turning back to FIG. 1, a steering assembly, including a steering wheel 50, is disposed in front of the left driver seat 36. The steering assembly is operatively connected to the two front wheels 20 to permit steering of the vehicle 10. As can be seen from the dotted lines in FIG. 1, the position of the steering wheel 50 can be adjusted. It is contemplated that the steering wheel 50 could have only a single fixed position. A display cluster 52 is mounted forward of the steering wheel 50. The display cluster 52 includes a number of screens and dials for the operation of the vehicle 10, such as a speedometer, odometer, engine speed indicator, fuel gauge, an engine temperature gauge, and the like.

The cockpit area 34 has openings 54 (54 and 54' for the vehicle of FIG. 3) on the left and right sides 16 of the vehicle 10 (only the left side being shown in FIG. 1) through which the riders can enter and exit the vehicle 10. It is contemplated that a lateral cover and/or a door could be selectively disposed across each opening 54. The lateral covers/doors would be disposed across the openings 54 when the riders are riding the vehicle 10 and could be opened by the driver and/or passenger when they desire to enter or exit the cockpit area 34.

A cargo box 56 is pivotally connected to the rear portion of the frame 18 rearward of the seats 36, 38, 40. The front end of the cargo box 56 is secured to the rear portion of the frame 18 by latches (not shown) connected between the cargo box 56 and the frame 18. The rear end of the cargo box 56 extends rearward of the rear portion of the frame 18 and of the rear wheels 22. The cargo box 56 has a pair of brackets 58 (only the left bracket 58 being shown in FIG. 1) extending downwards from its lower surface. The brackets 58 pivotally connect the cargo box 56 to the rear portion of the frame 18 such that the front end of the cargo box 56 can be pivoted upwards to access the engine 32 and other internal components of the vehicle 10 located thereunder, or to unload the contents of the cargo box 56. A pneumatic piston (not shown) extends between the rear portion of the frame 18 and the lower surface of the cargo box 56 in order to pivot the cargo box 56 and to support the cargo box 56 in its pivoted position. It is contemplated that the cargo box 56 could be fixed. It is also contemplated that the cargo box 56 could be omitted.

The powertrain of the vehicle 10 and components associated with the powertrain will now be described with reference to FIGS. 1 and 2. As can be seen in FIG. 1, the engine 32 is disposed longitudinally rearward of the cockpit area 34 and is mounted to the rear portion of the frame 18. As will be described in more detail below, the engine 32 drives the front and rear wheels 20, 22. It is contemplated that the engine 32 could selectively switch between driving two and four of the wheels 20, 22. It is also contemplated that the engine 32 could drive only the front wheels 20 or only the rear wheels 22.

The engine 32 of the present embodiment is a four-stroke V-twin engine. Accordingly, as can be seen in FIG. 2, the engine 32 has two cylinders 60 extending at an angle from each other. The engine 32 has an output shaft (not shown) extending horizontally and laterally. It is contemplated that other types of motors could be used. For example, it is contemplated that the motor could be a two-stroke engine with in-line cylinders 60 or that the motor could be an electric motor. The engine 32 receives fuel from a fuel tank (not shown) disposed to the right of the engine 32. It is contemplated that the fuel tank could be located elsewhere on the vehicle. The engine 32 receives air via an air induction system (not shown) disposed above the fuel tank. The air induction system includes an intake manifold connected to the two cylinders 60, a throttle body connected upstream of the intake manifold, an air box connected upstream of the throttle body, and a number of air intake conduits extending between these components. An exhaust system (not shown) delivers exhaust gases from the engine 32 to the atmosphere. The exhaust system includes exhaust conduits, an exhaust manifold, and a muffler.

As can be seen in FIG. 2, a continuously variable transmission (CVT) 62 is disposed on a left side of the engine 38. The CVT 62 has a driving pulley, a driven pulley and a belt (all not shown) looped around the driving and driven pulleys to transmit torque therebetween. The driving pulley, the driven pulley and the belt are disposed inside a cover 64. The driving pulley is mounted on the output shaft of the engine 32 so as to rotate therewith. It is contemplated that the driving pulley could be connected to another shaft that is driven by the output shaft. The driven pulley is mounted on an input shaft of a transmission 66 so as to drive the input shaft and therefore the transmission 66. The transmission 66 is connected to the rear portion of the engine 32. An air intake conduit 68 is connected to the front portion of the CVT 62 for drawing cool air inside the cover 64 of the CVT 62 for cooling the CVT 62. The heated air inside the cover 64 of the CVT 62 is released to the atmosphere by a conduit 70 connected to the rear portion of the CVT 62.

The transmission 66 transfers the torque from the CVT 32 to a front driveshaft (not shown) and a rear differential 72. The front driveshaft passes through a casing of the engine 32 and connects to another front driveshaft 74 via a universal joint 76. The front end of the front driveshaft 74 connects to another universal joint 78. The universal joint 78 connects the front driveshaft 74 to a front differential 80. The front differential 80 is connected, via left and right constant velocity joints (not shown) enclosed in flexible boots 82, to left and right front drive axles 84. The front drive axles 84 are connected to spindles 86 of the front wheels 20 via constant velocity joints (not shown) enclosed in flexible boots 88. The spindles 86 are rotatably suspended from the frame 18 by the front suspension assemblies 26. The rear differential 72 is connected, via left and right constant velocity joints (not shown) enclosed in flexible boots 90, to left and right rear drive axles 92. The rear drive axles 92 are connected to spindles 94 of the rear wheels 22 via constant velocity joints (not shown) enclosed in flexible boots 96. The spindles 94 are rotatably suspended from the frame 18 by the rear suspension assemblies 28.

Additional features of a vehicle similar to the vehicle 10 can be found in International Patent Application No. PCT/IB2015/050800, filed Feb. 2, 2015, the entirety of which is incorporated herein by reference. Additional features of a vehicle similar to the embodiment of the vehicle 10 having two rows of seats can be found in International Patent Publication No. WO2013/116459 A1, published Aug. 8, 2013, the entirety of which is incorporated herein by reference.

Turning now to FIGS. 4 to 8, the pivoting mechanism of the seat base 42 of the front right passenger seat 40 of the vehicle 10 of FIG. 3 will be described in more detail. As the pivoting mechanisms of the seat bases 42 of the front right and middle passenger seats 38, 40 of the vehicle 10 of FIG. 1, the front middle passenger seat 38 of the vehicle of FIG. 3, the rear left passenger seat 36', the rear middle passenger seat 38' and the rear left passenger seat 40' are identical to that of the front right passenger seat 40 of the vehicle 10 of FIG. 3, they will not be described in detail below. It is contemplated that the pivoting mechanisms of the various seat bases 42 could not be identical. It is also contemplated that all, or at least some, of the seat bases 42 could be provided with a pivoting mechanism that differs from the one described below.

A rod 100 is connected to the frame 12 by three support members 102 (only one being shown). The rod 100 spans a width of the cockpit area 34'. One support member 102 is disposed below the front left driver seat 36, another support member 102 is disposed below the front middle passenger seat 38, and another support member 102 is disposed below the front right passenger seat 40. Each support member 102 is linear and extends vertically downward from the rod 100 toward a cockpit floor 104 of the cockpit area 34'.

Figure 4:
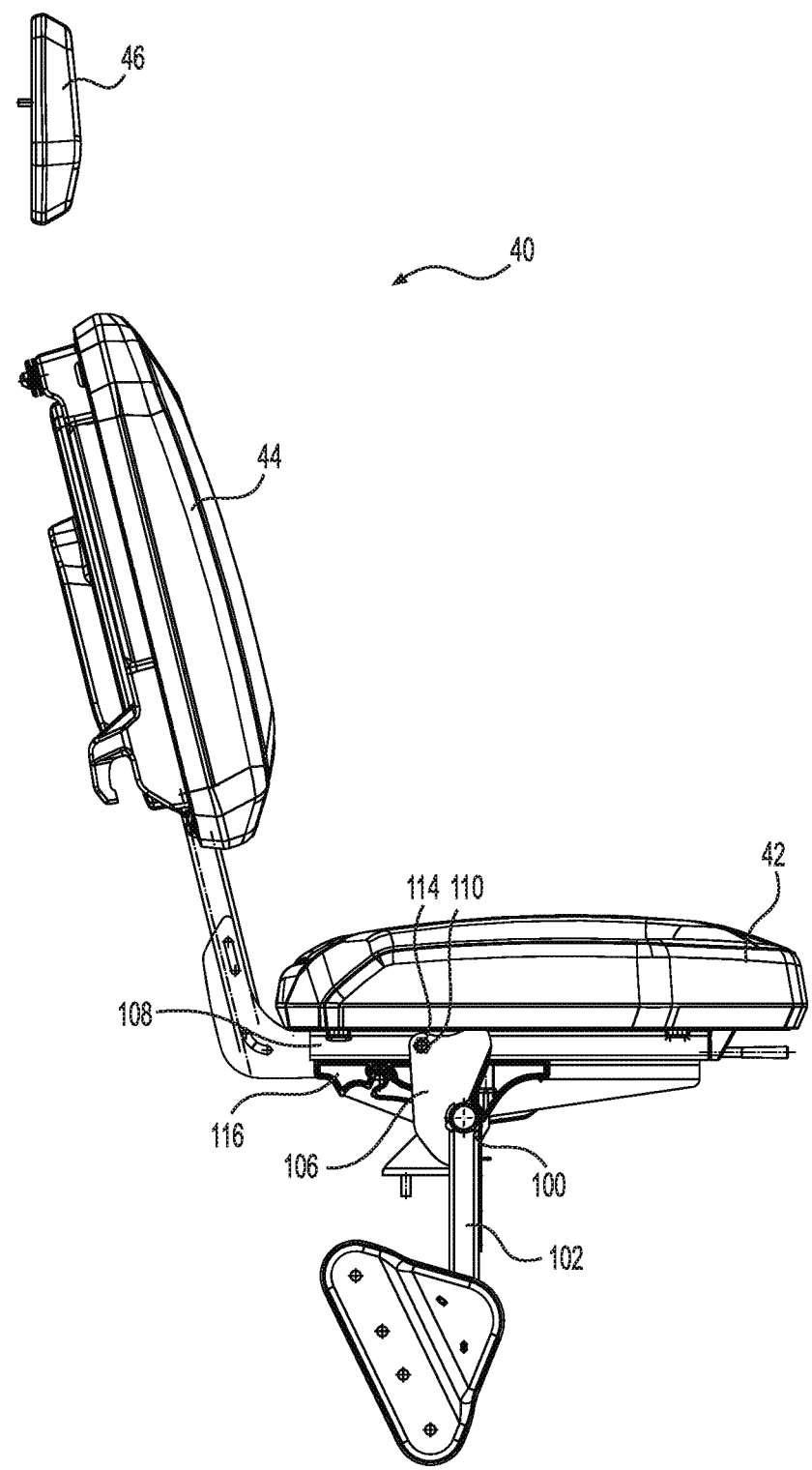
FIG. 4 is a close-up, right side elevation view of a front passenger seat of the vehicle of FIG. 1 with the seat disposed in a seating position.

With reference to FIG. 4, the seat base 42 is pivotally connected to the rod 100 by a pair of attachment brackets 106. The brackets 106 are disposed on each side of the seat base frame 108 of the seat base 42. FIG. 4 shows the right attachment bracket 106 connected to the seat base 42. The left attachment bracket 106 (see FIG. 16) is generally a mirror image of the right attachment bracket 106 and thus, only the right attachment bracket 106 will be described herein. The front edge of the attachment bracket 106 is welded to a rear surface of the rod 100. The attachment bracket 106 extends upward and rearward from the rod 100 to the seat base frame 108. The attachment bracket 106 is connected to the seat base frame 108 by a bolt 110 inserted through the aligned through-holes 112 (see FIG. 5) to pivotally connect the seat base frame 108 to the attachment bracket 106. The seat base 42 thus pivots about the attachment bracket 106 about a pivot axis 114 (see FIG. 5) defined by the aligned through-holes 112. It is contemplated that the attachment brackets 106 could connect the seat base frame 108 to the frame 18 directly or via other components.

A pair of retaining brackets 116 is connected to the seat base frame 108. Since the left retaining bracket 116 is generally a mirror image of the right retaining bracket 116, only the right retaining bracket 116 will be described in detail herein. With reference to FIGS. 5 to 8, the retaining bracket 116 has a front end 118 and a rear end 120. When the seat base 42 is disposed in the seating position, shown in FIGS. 3 to 5 and 20, the front end 118 is disposed forward of the rear end 120. When the seat base 42 is in a storage position, shown in FIGS. 7 to 19, the front end 118 is disposed above the rear end 120.

Figure 5:
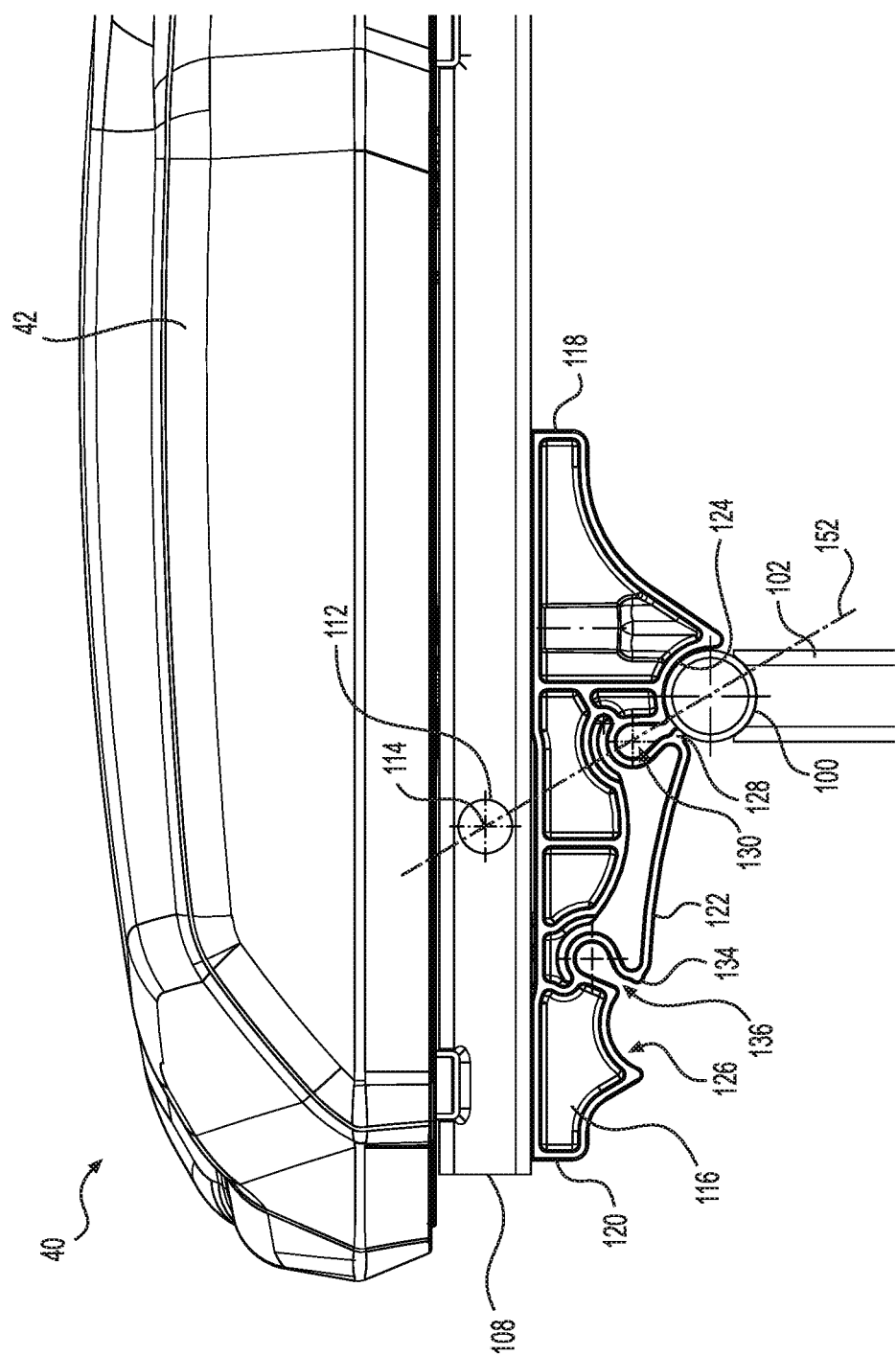
FIG. 5 is a close-up, right side elevation view of a seat base of the seat of FIG. 4 disposed in a seating position with a mounting bracket of the right seat base removed for clarity.
Figure 7:
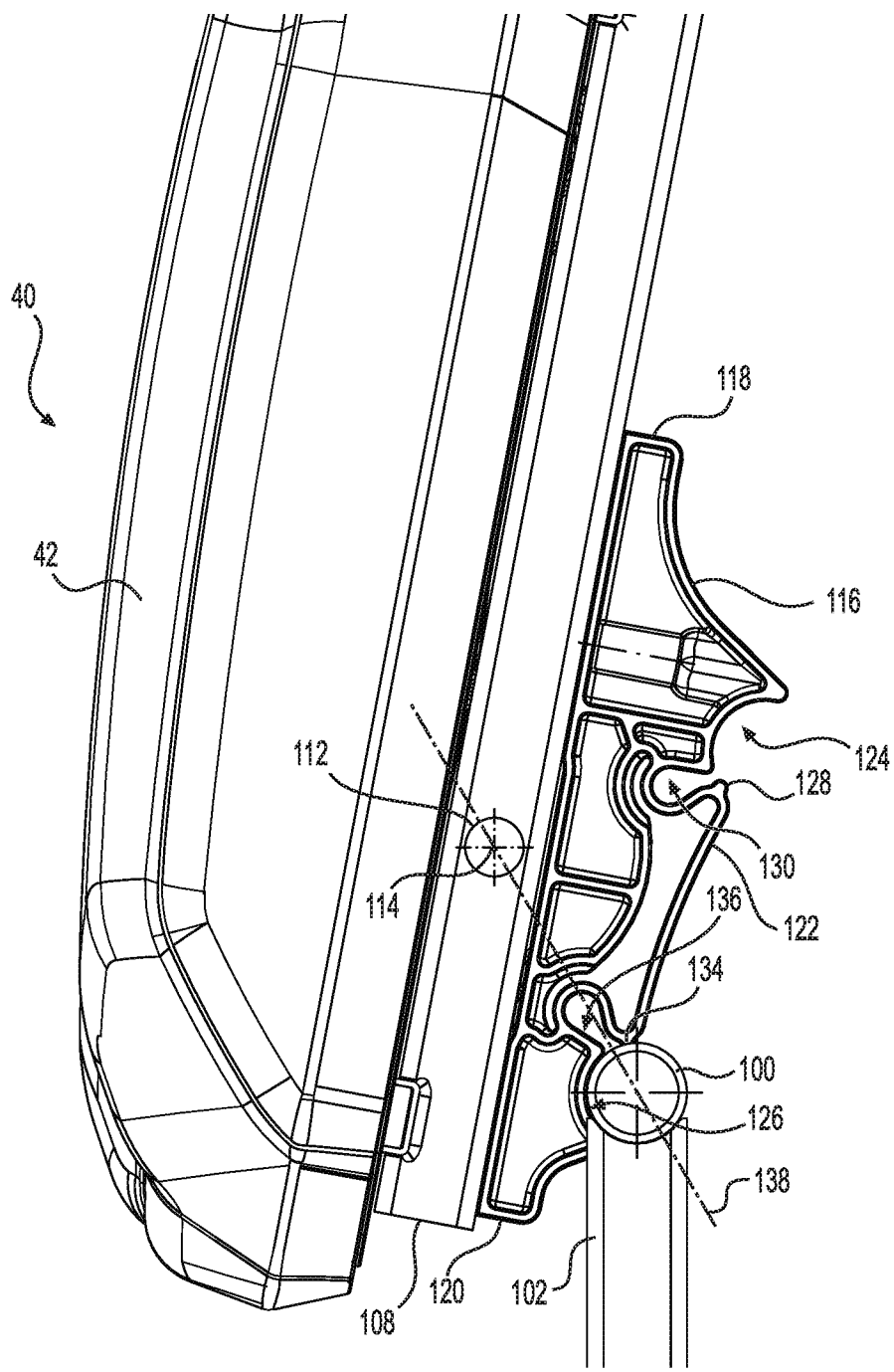
FIG. 7 is a close-up, right side elevation view of the seat base of FIG. 5 disposed in a storage position.

The retaining bracket 116 has a retaining surface 122 extending between the front and rear ends 118, 120. The retaining surface 122 forms an arc-shaped groove 124 near its front end 118 and another arc-shaped groove 126 near its rear end 120. With reference to FIG. 5, when the seat base 42 is disposed generally horizontally in a seating position, the rod 100 is received in the front groove 124, which is therefore referred to herein as the seating position groove 124. With reference to FIG. 7, when the seat base 42 is disposed in a storage position, the rod 100 is received in the rear groove 126, which is therefore referred to herein as the storage position groove 126.

Figure 8:
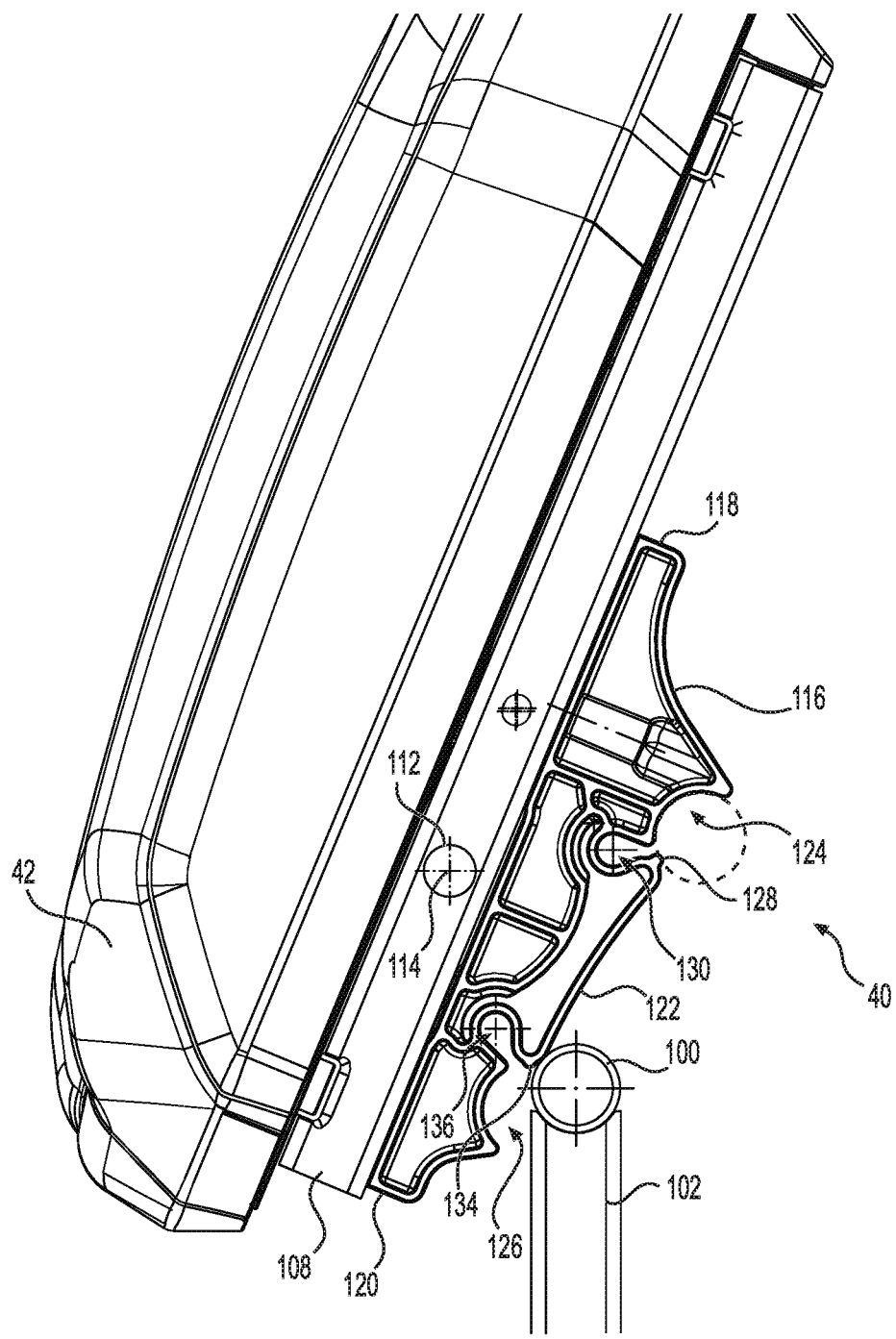
FIG. 8 is a close-up, right side elevation view of the seat base of FIG. 5 disposed in an intermediate position slightly prior to being placed in a storage position.

Near the seating position groove 124 and spaced therefrom, the retaining surface 122 has a knob-like projection 128. The projection 128 is separated from the surface of the seating position groove 124 by a groove 130 that is deeper and narrower than the seating position groove 124. As can be seen in FIG. 8, the projection 128 projects inside an imaginary circle formed by extending the arc-shaped seating position groove 124. Thus, as can be seen in FIG. 5, in the seating position, when the rod 100 is disposed in the seating position groove 124, the projection 128 pushes onto the rod 100. In the seating position, the projection 128 and the seating position groove 128 are on opposite sides of an imaginary plane 132 containing the pivot axis 114 and the central axis of the rod 100 so that the force exerted by the projection 128 pushing against the rod 100 biases the seat base 42 to remain in the seating position. The projection 128 thus retains the seat base 42 in the seating position and also prevents any slight relative movement between the seating position groove 124 and the rod 100 that could cause unwanted noise or "rattling" of the seat base 42 when disposed in the seating position.

Figure 6:
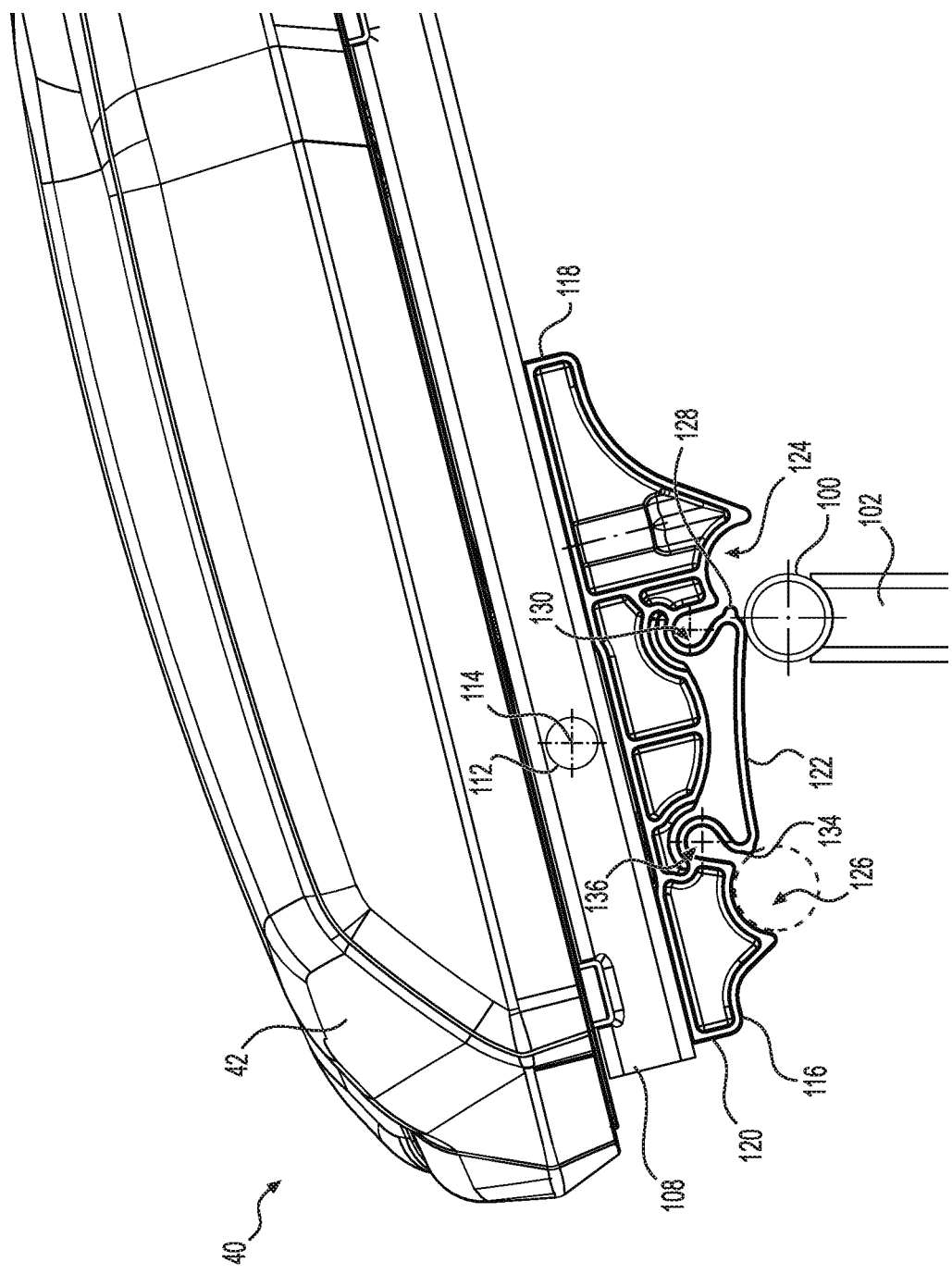
FIG. 6 is a close-up, right side elevation view of the seat base of FIG. 5 disposed in an intermediate position slightly prior to being placed in a seating position.

Near the storage position groove 126 and spaced therefrom, the retaining surface 122 has a knob-like projection 134. The projection 134 is separated from the surface of the storage position groove 126 by a groove 136 that is deeper and narrower than the storage position groove 126. As can be seen in FIG. 6, the projection 134 projects inside an imaginary circle formed by extending the arc-shaped storage position groove 126. Thus, as can be seen in FIG. 7, in the storage position, when the rod 100 is disposed in the storage position groove 126, the projection 134 pushes onto the rod 100. In the storage position of the seat base 42, the projection 134 and the storage position groove 126 are on opposite sides of an imaginary plane 138 containing the pivot axis 114 and the central axis of the rod 100 so that the force exerted by the projection 134 pushing against the rod 100 biases the seat base 42 to remain in the storage position. The projection 134 thus retains the seat base 42 in the storage position and also prevents any slight relative movement between the surfaces of the storage position groove 126 and the rod 100 that could cause unwanted noise or "rattling" of the seat base 42 when disposed in the storage position.

As can be seen in FIGS. 6 and 8, the rod 100 pushes against the retaining surface 122 between the projections 128 and 134 when the seat base 42 is being moved between the seating and storage positions. The retaining surface 122 flexes to allow the seat base 42 to move between the seating and storage positions.

With reference to FIGS. 5 and 6, the rod 100 can be disengaged from the seating position groove 124 by applying an upward and rearward force to the front portion of the seat base 42 so that the rod 100 presses rearwards against the projection 128, thereby slightly deforming the retaining surface 122 adjacent the projection 128 and allowing the rod 100 to slide past the projection 128. The rod 100 is thus no longer retained in the seating position groove 124 and the seat base 42 is no longer retained in the seating position.

Similarly, with reference to FIGS. 7 and 8, the rod 100 can be disengaged from the storage position groove 126 by applying an downward and forward force to the front portion of the seat base 42 so that the rod 100 presses upwardly against the projection 134, thereby slightly deforming the retaining surface 122 adjacent the projection 134 and allowing the rod 100 to slide past the projection 134. The rod 100 is thus no longer retained in the storage position groove 126 and the seat base 42 is no longer retained in the seating position.

Additional details regarding the pivoting mechanism of the seat bases 42 and alternative embodiments of pivoting mechanisms can be found in International Patent Application No. PCT/IB2015/050800, filed Feb. 2, 2015.

Figure 14:
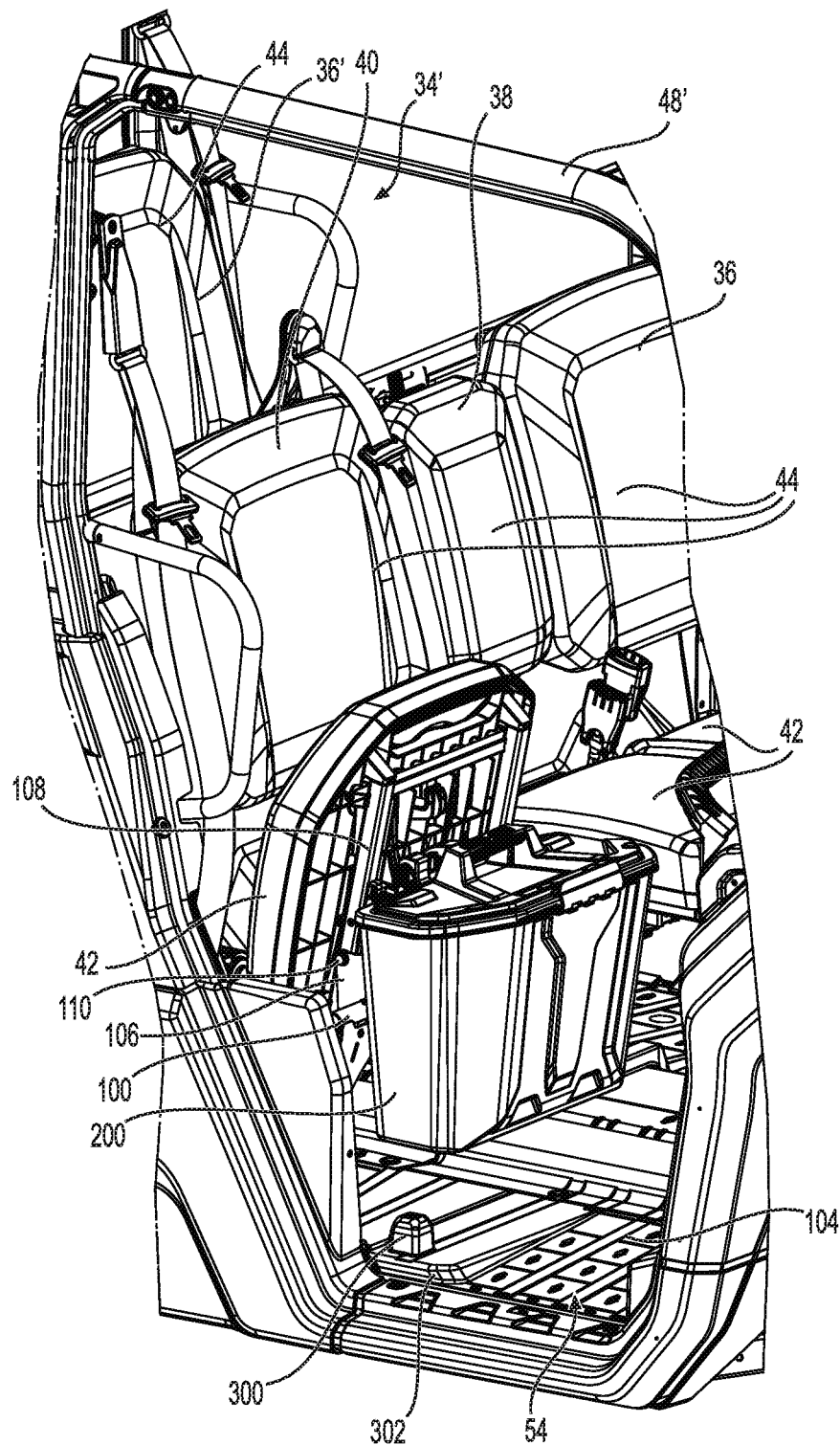
FIG. 14 is a perspective view of a central portion of the vehicle of FIG. 3 with the seat base of the front right passenger seat in the storage position and the storage container of FIG. 9A being spaced from the floor of the vehicle.
Figure 15:
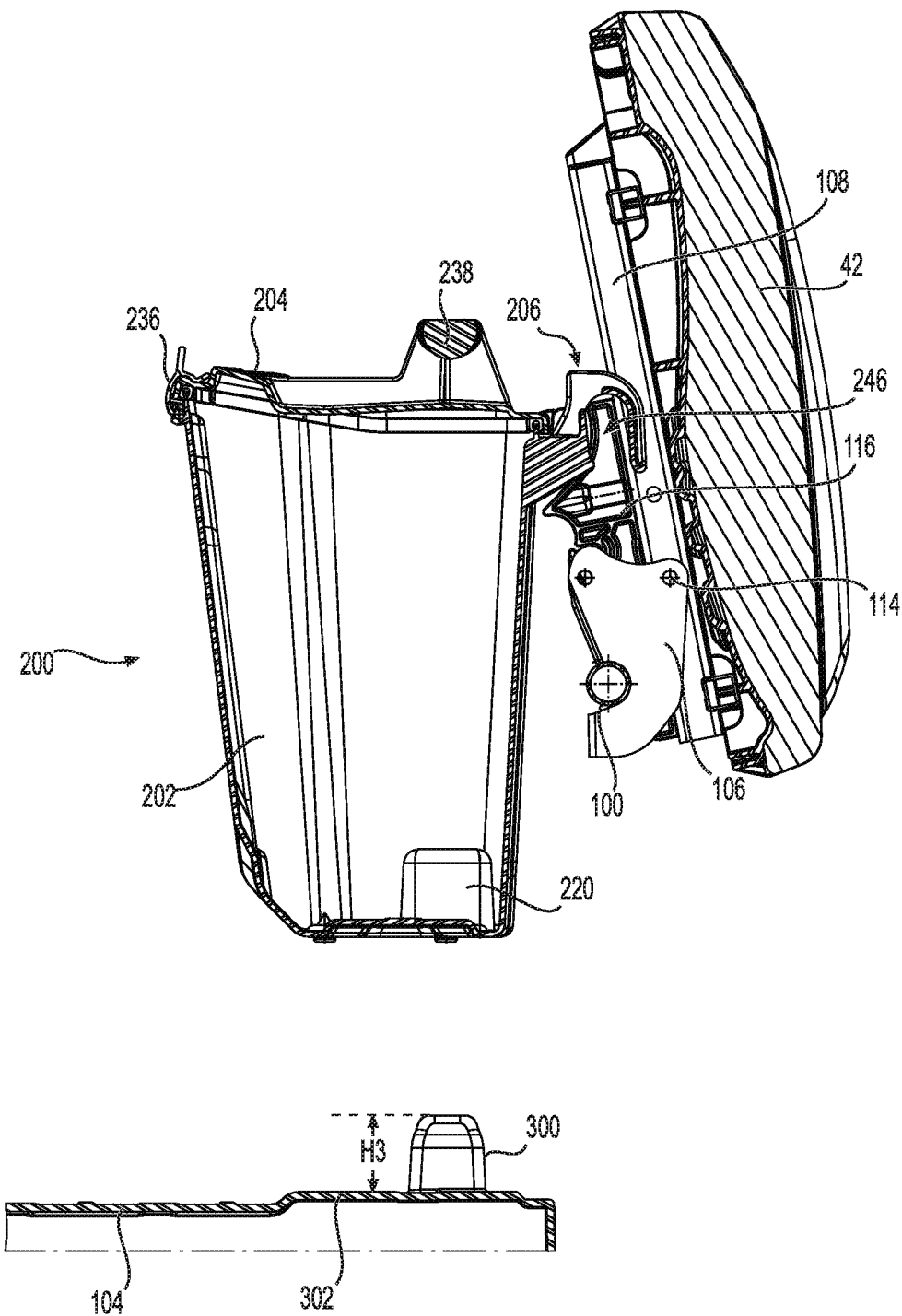
FIG. 15 is a cross-sectional view of the storage container, cockpit floor and seat base in the position shown in FIG. 14.

As can be seen in FIG. 3, three storage containers 200 are disposed on the cockpit floor 104 under the seat bases 42 of the front right passenger seat 40, the rear right passenger seat 40' and the rear left passenger seat 36'. As is schematically shown in dotted lines in FIG. 1, the front right passenger seat 40 of the vehicle 10 of FIG. 1 also has a storage container 200 under its seat base 42. It is contemplated that only one or two of the seats 40, 40', 36' could have a storage container 200 under its seat base 42. It is also contemplated that a storage container 200 could also be provided under the seat base 42 of the front left driver seat 36 in an embodiment where the seat base 42 of the front left driver seat 36 is pivotable. It is also contemplated that storage containers similar to the storage containers 200 but narrower could also be provided under the seat bases 42 of the front and rear middle seats 38, 38'. As will be described in greater detail below, as can be seen in FIGS. 14 and 15, when the seat base 42 of one of the seats 40, 40', 36' is in its storage position, the corresponding storage container 200 can be removed from the vehicle 10 and, once removed, can be reinstalled. The storage containers 200 can be installed and removed without the use of tools.

With reference to FIGS. 9A to 13, one of the storage containers 200 will be described. The other storage containers 200 are identical, but it is contemplated that they could differ from each other. The storage container 200 has a storage container body 202, a lid 204 and a clip 206. In the present embodiment, the storage container body 202, the lid 204 and the clip 206 are made of plastic, but it is contemplated that other materials could be used. It is contemplated that the lid 204 could be omitted.

Figure 13:
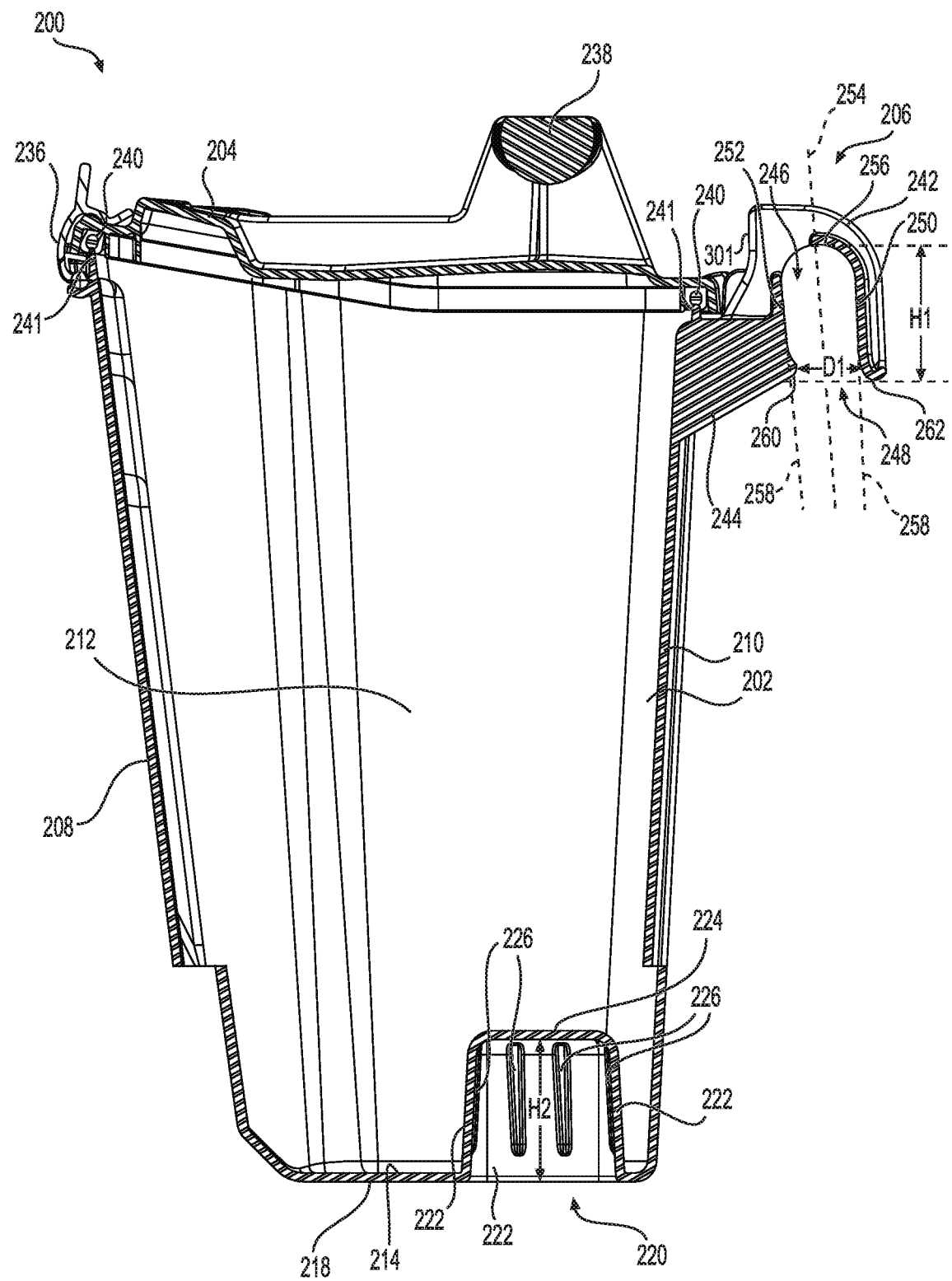
FIG. 13 is a cross-sectional view of the container of FIG. 9A taken through line 13-13 of FIG. 12.

The storage container body 202 has a front side wall 208, a rear side wall 210, left and right side walls 212 and a bottom wall 214. As can be seen in FIGS. 10 and 11, four rubber feet 216 are connected to the bottom wall 214 and extend below the bottom surface 218 of the bottom wall 214. The rubber feet 216 reduce the transmission of vibrations between the cockpit floor 104 and the storage container 200 when the vehicle 10 is in operation. The bottom surface 218 also defines a recess 220. As best seen in FIG. 11, the recess 220 is eccentrically located in the bottom surface 218 (i.e. it is off-center). More specifically, the recess 220 is located in a rear, right corner of the bottom wall 214. As can be seen in FIG. 11, the recess 220 has the shape of a square with rounded corners. The recess 220 has four walls 222 extending upward into an interior of the storage container 200 as can be seen in FIG. 13 and a top wall 224. As can be seen in FIG. 13, the walls 222 taper toward the top wall 224. Each of the four walls 222 is provided with two ribs 226 on a side of the wall 222 facing inside the recess 220. It is contemplated that each wall 222 could have only one or more than two ribs 226. It is also contemplated that the walls 222 could have no ribs 226. It is also contemplated that the walls 222 could not all have the same number of ribs 226. It is also contemplated that the recess 220 could have a different shape. For example, the recess 220 could have a cylindrical side wall with a circular top wall.

The lid 204 is pivotally connected to the storage container body 202 by four hinges 228 located on a rear of the storage container 200. The lid 204 can pivot between a closed position (shown in FIG. 9A) where the lid 204 prevents access to the interior of the storage container 200 and an open position (shown in FIG. 9B) where the lid 204 permits access to the interior of the storage container 200. Each hinge 228 has a shaft 230 connected to the rear side wall 210 of the container body 202 and a hook 232 connected to the rear edge of the lid 204. The hooks 232 hook around their respective shafts 230 (see FIG. 21). Each shaft 230 has a ramp 234 (FIG. 9A) on an upper side thereof. The ramps 234 cooperate with surfaces of the hooks 232 to maintain the lid 204 open when it is moved to its open position without requiring a user to hold it open. A latch 236 connected to the front side wall 208 of the storage container body 202 is used to lock the lid 204 in its closed position. It is contemplated that the lid 204 could be connected to the storage container body 202 in other ways. For example, it is contemplated that the hinges 228 could be omitted and that two or more latches 236 could be used to lock the lid 204 in its closed position. Opening the latches 236 would then permit the lid 204 to be completely removed from the container body 202, which would correspond to the open position of the lid 204 in such an embodiment. A handle 238 is integrally formed with the lid 204. It is contemplated that the handle 238 could be connected in other ways to the lid 204 such as, but not limited to, by fasteners. It is contemplated that the handle 238 could be omitted. As best seen in FIGS. 9B, 9D, 13 and 21, the lid 204 defines a channel along a contour of its undersurface inside which a seal 240 is disposed. When the lid 204 is closed and the latch 236 is locked, the seal 240 presses against an upper lip 241 of the storage container body 202. As a result, water and dirt are prevented from entering the interior of the storage container 200 when the lid 204 is closed and locked with the latch 236. It is contemplated that the seal 240 could be provided along the upper edge of the storage container body 202 instead. It is also contemplated that the seal 240 could be omitted.

The clip 206 has a generally inverted-U shaped portion 242 that is connected to an upper portion of the rear side wall 210 by a plurality of ribs 244 (see FIG. 10). In the present embodiment, the clip 206 is integrally formed with the storage container body 202. It is contemplated that the clip 206 could be connected to the storage container body 202 in other ways, such as, but not limited to, by fasteners. As can be seen in FIG. 11, the width of the clip 206 tapers as it extends rearward. As best seen in FIG. 13, the inverted-U shaped portion 242 defines a passage 246 that has an open end 248 facing toward a bottom of the storage container body 202.

When the storage container 200 is removed from the vehicle 10 as in FIG. 13, the front facing wall 250 and the rear facing wall 252 of the clip 206 that define the passage 246 extend toward each other as they extend downward. As such, the passage 246 tapers toward the open end 248. A central axis 254 of the passage 246 is slightly angled relative to a line normal to a horizontal plane defined by the bottom surface 218 of the storage container body 202. The central axis 254 is an axis that passes through a center of curvature of the curved upper portion 256 of the passage 246 and a point where the imaginary extension lines 258 of the walls 250, 252 converge. In the present embodiment, a radius of curvature of the curved upper portion 256 of the passage 246 corresponds to the radius of curvature of the rod 100. A protrusion 260 is provided at the bottom of the rear facing wall 252. As can also be seen in FIG. 13, the height H1 of the passage 246 is smaller than the height H2 of the recess 220. The height H1 of the passage 246 is greater than a diameter of the rod 100 to which the clip is to be attached as will be discussed below. The size D1 of the open end 248 is smaller than the diameter of the rod 100. It is contemplated that in some embodiments, the rod 100 could be replaced with another member that could have a non-circular cross-section. In such an embodiment, the clip 206 and the member would be sized such that the height H1 of the passage 246 is greater than a diameter of the member in the vertical direction and the size D1 of the open end 248 of the passage 246 is smaller than an diameter of the member in the longitudinal direction of the vehicle 10. The bottom surface of the protrusion 260 and of the lower end 262 of the wall 250 are rounded to facilitate insertion of the rod 100 in the passage 246 as will be discussed below.

Figure 9C:
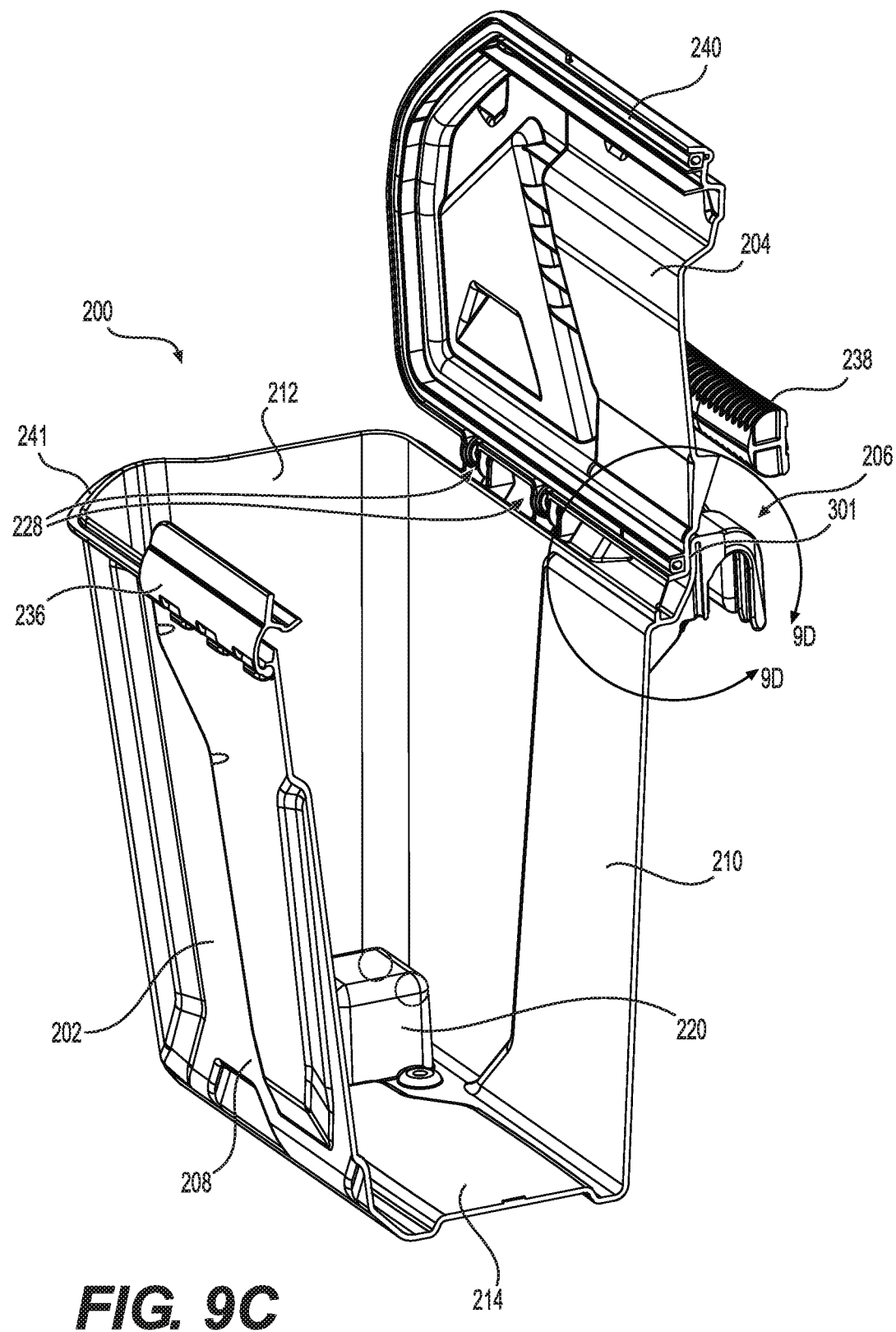
FIG. 9C is a cross-sectional view of the storage container of FIG. 9A with the lid fully open.
Figure 12:
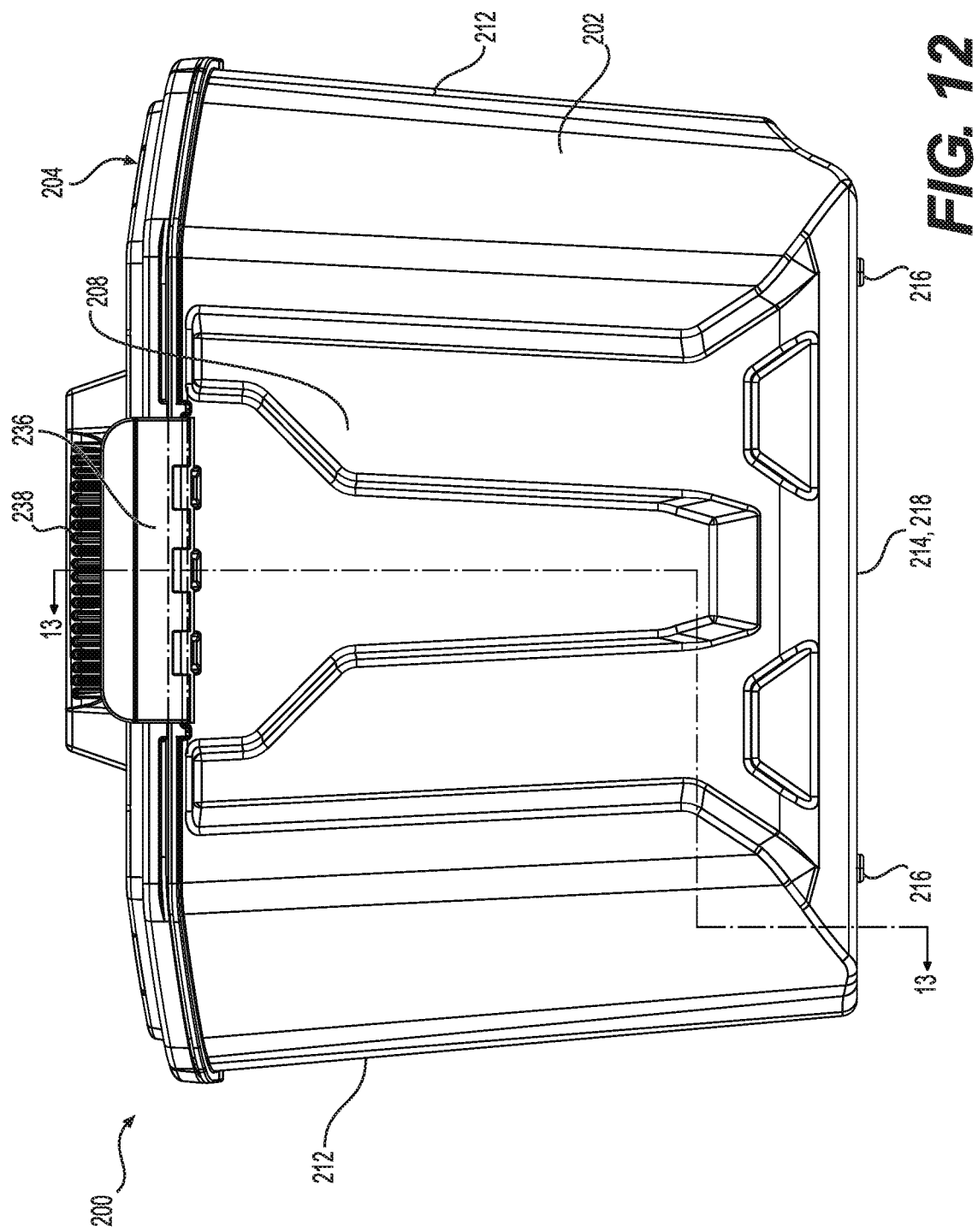
FIG. 12 is a front elevation view of the container of FIG. 9A.
Figure 16:
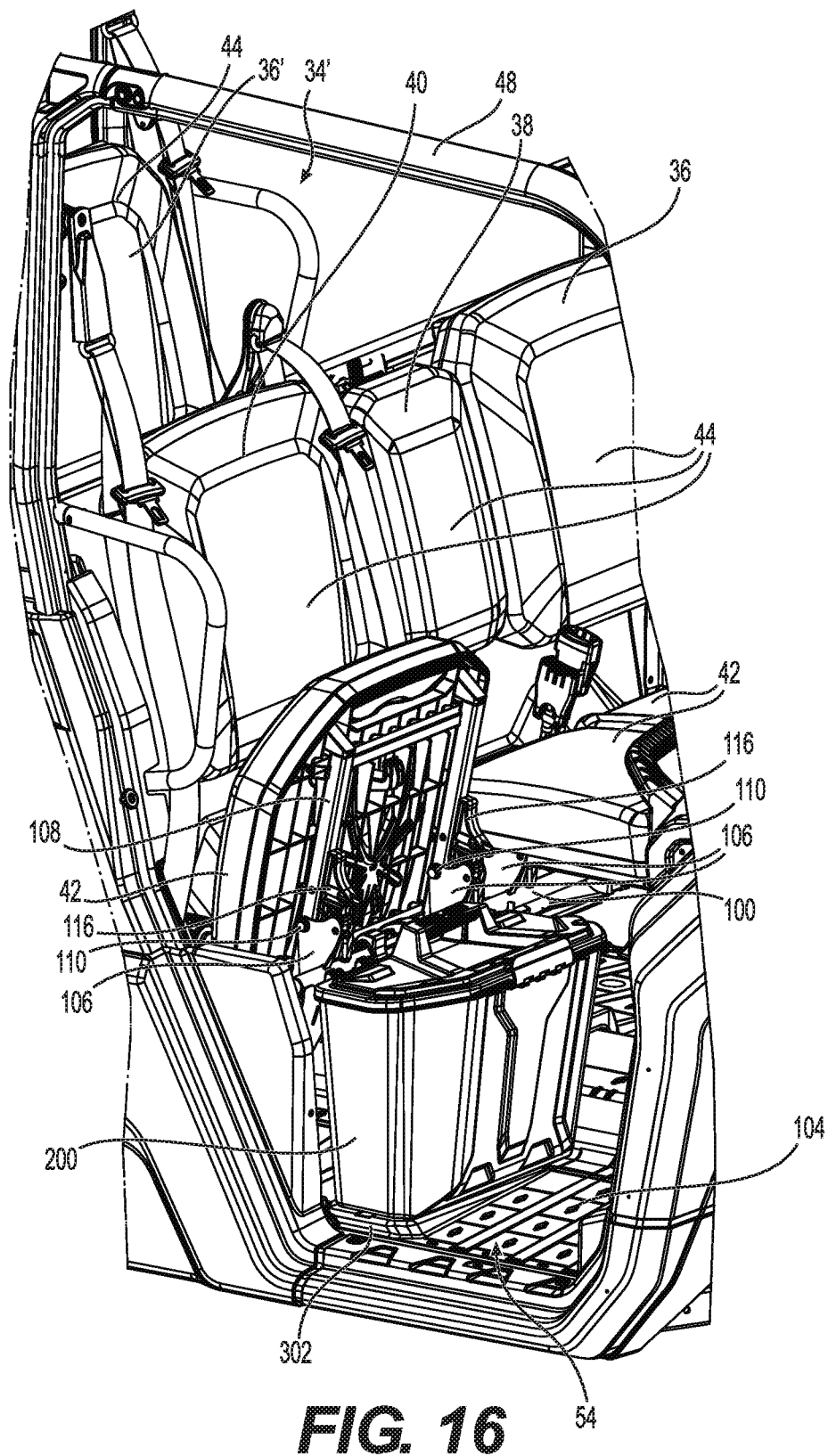
FIG. 16 is a perspective view of the central portion of the vehicle of FIG. 14 with the seat base of the front right passenger seat in the storage position and the storage container in an installed position.
Figure 17:
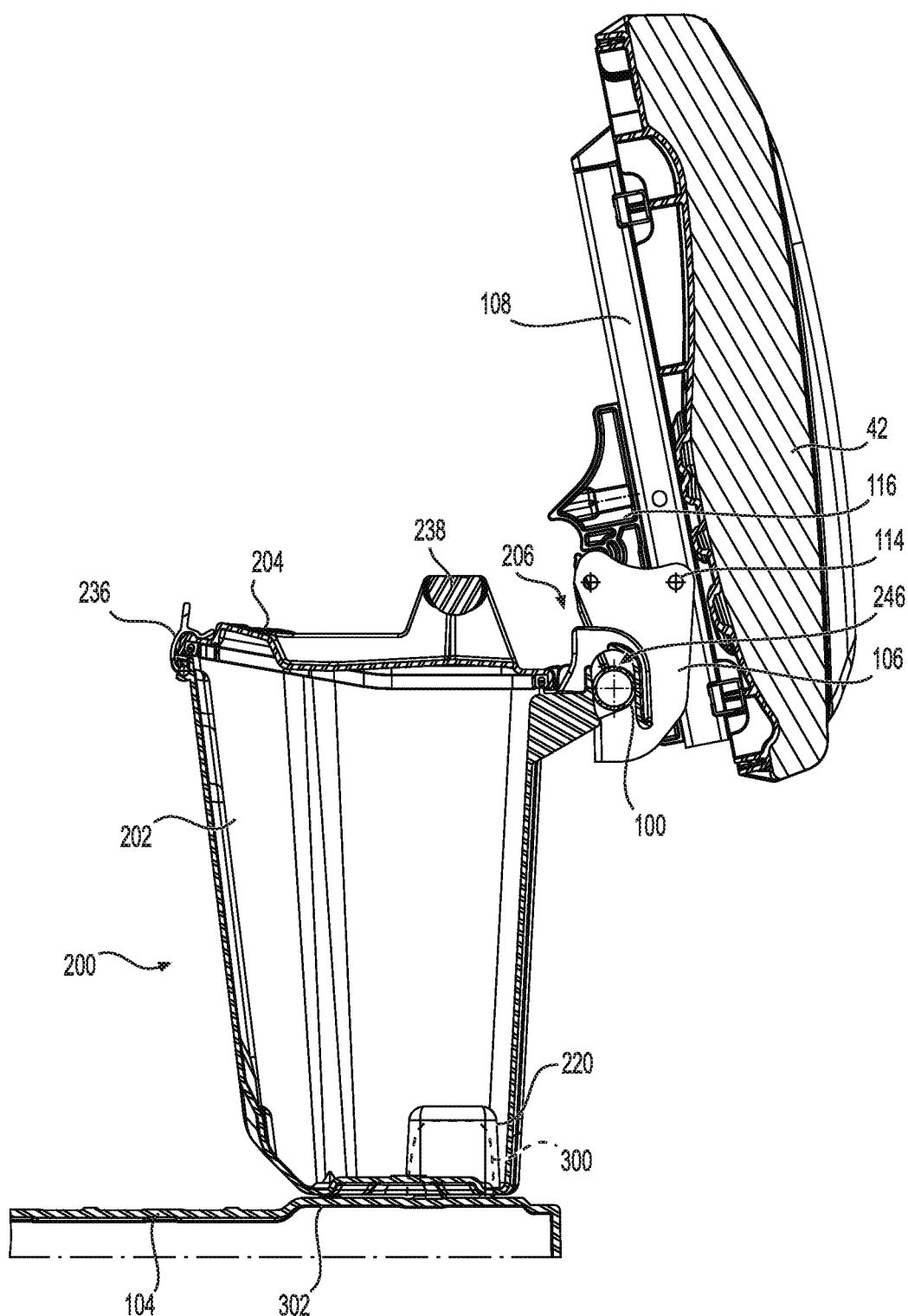
FIG. 17 is a cross-sectional view of the storage container, cockpit floor and seat base in the position shown in FIG. 16.
Figure 18:
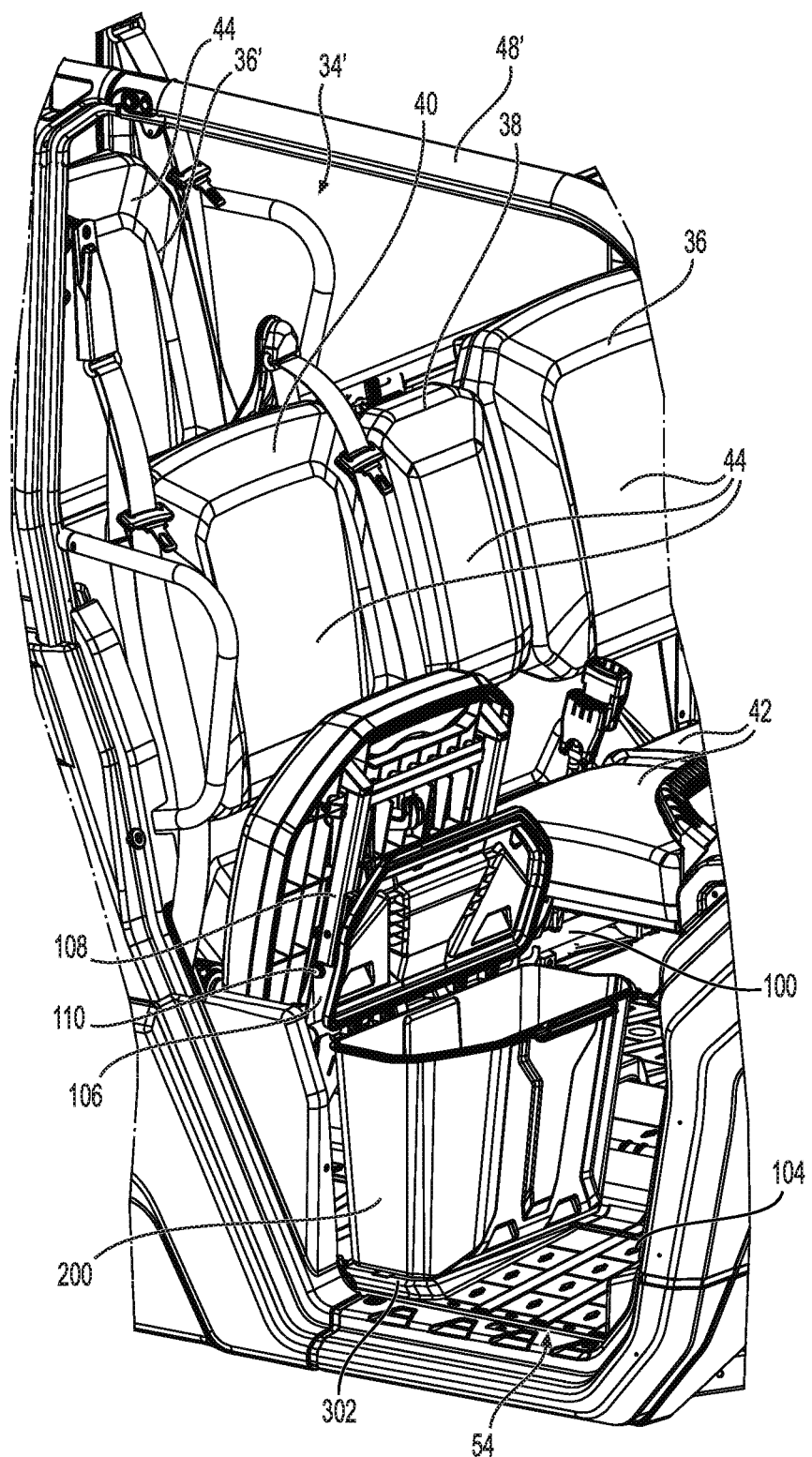
FIG. 18 is a perspective view of the central portion of the vehicle of FIG. 14 with the seat base of the front right passenger seat in the storage position and the storage container in the installed position with its lid open.
Figure 19:
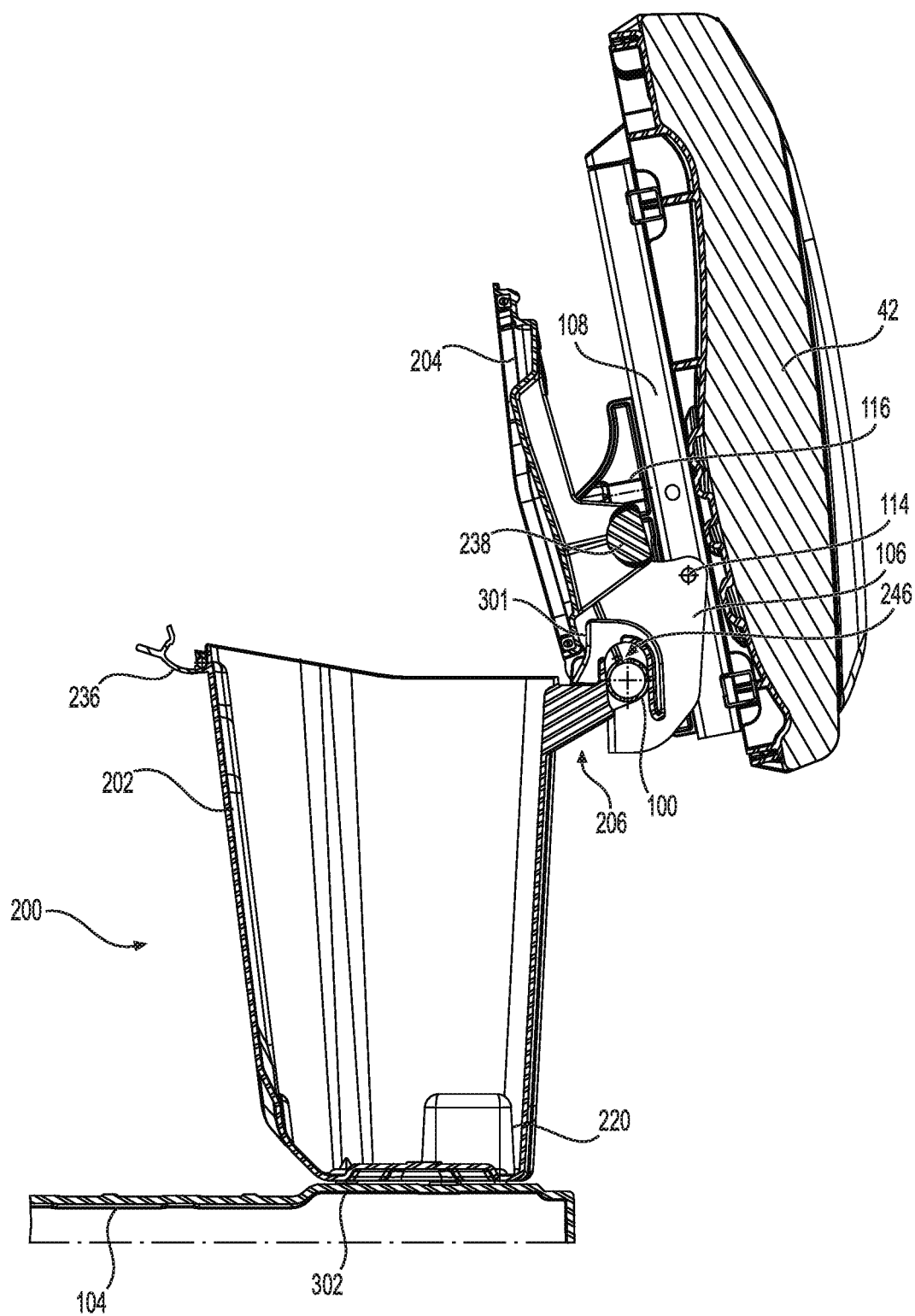
FIG. 19 is a cross-sectional view of the storage container, cockpit floor and seat base in the position shown in FIG. 18.
Figure 20:
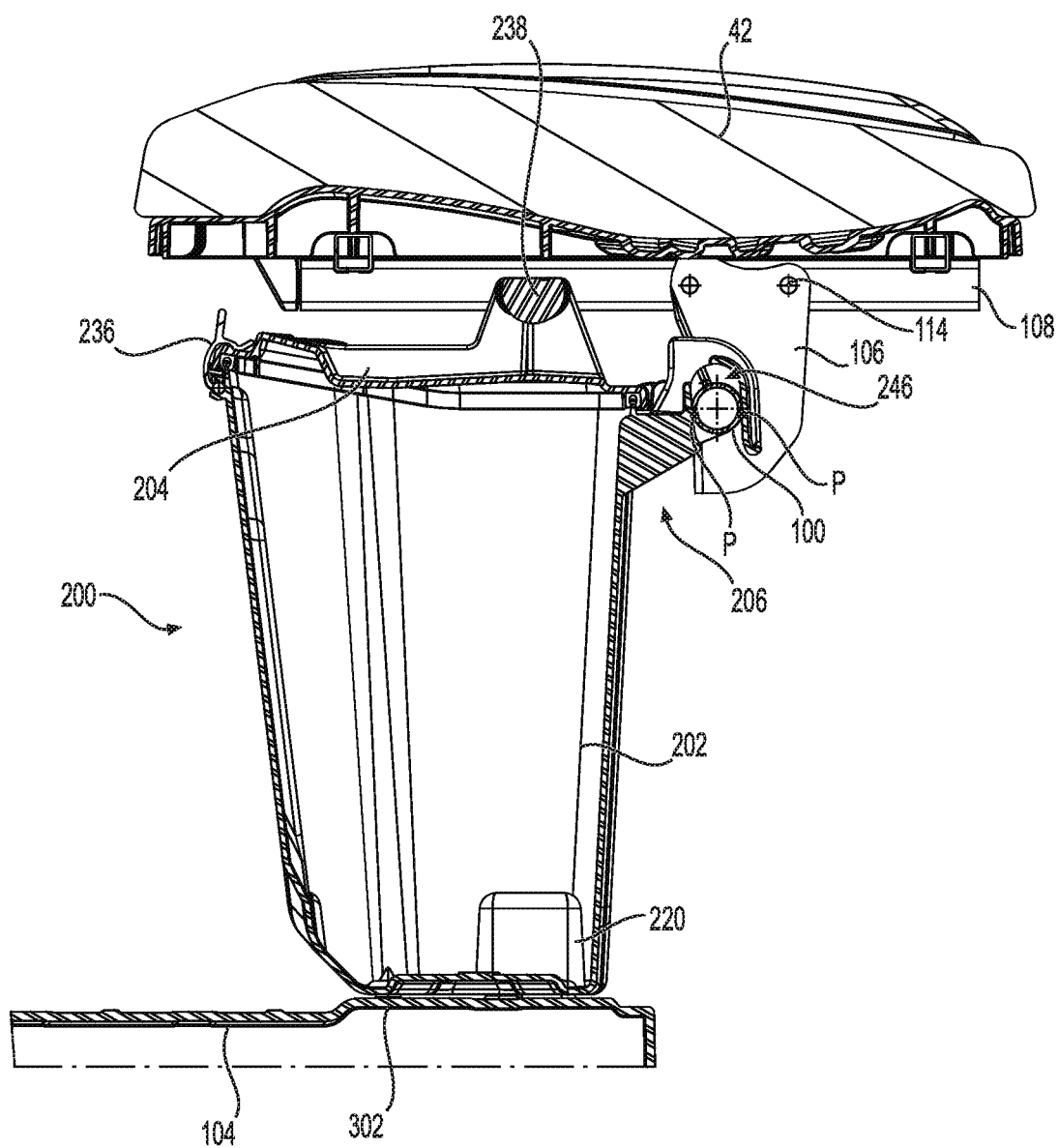
FIG. 20 is a cross-sectional view of the seat base of the front, right passenger seat, the storage container disposed under the front, right passenger seat and the cockpit floor in the position shown in FIG. 3.

To install the storage container 200 in the vehicle 10, the seat base 42 first has to be moved to the storage position as shown in FIGS. 14, 15. The storage container 200 is then lowered such that a protrusion 300 extending from the cockpit floor 104 is received in the recess 220 and that the rod 100 is received in the passage 246 defined by the clip 206 as shown in FIGS. 16, 17. When the storage container 200 is installed and the seat base 42 is in the storage position, the lid 204 can be opened to provide access to the interior of the storage container 200 without having to remove the storage container 200 from the vehicle 10 as can be seen in FIGS. 18 and 19. As shown in FIG. 19, when the storage container 200 is installed, the lid 204 can be opened until it abuts the retaining brackets 116. Alternatively, it is contemplated that the lid 204 could abut the seat base frame 108 or bottom of the seat base 42. When the lid 204 of the storage container 200 is closed, the seat base 42 can be moved to the seating position as shown in FIGS. 3 and 20. As a result, the storage container 200 is between the seat base 42 and the cockpit floor 104 and the seat base 42 prevents removal of the storage container 200. As can be seen in FIG. 20, the storage container 200 is sized such that it does not extend forward of the seat base 42 when the seat base 42 is in the seating position such that the storage container 200 does not interfere with the legs of a passenger sitting on the seat base 42. To remove the storage container 200 from the vehicle 10, the seat base 42 first has to be moved to the storage position as shown in FIGS. 16, 17, and the storage container 200 then has to be lifted to disengage the clip 206 from the rod 100 and to remove the protrusion 300 from the recess 220. This can be done by first ensuring that the latch 236 locks the lid 204 in the closed position and then holding and pulling up on the handle 238 of the storage container 200. Once the container 200 is removed, the lid 204 can be opened by unlocking the latch 236. When the container 200 is removed, the lid 204 can be opened until it abuts abutment surfaces 301 defined by a front portion of the clip 206, as can be seen in FIGS. 9C and 9D. As can be seen in FIG. 19, when the container 200 is installed in the vehicle 10 and the seat base 42 is in the storage position, the lid 204 abuts the retaining brackets 116 before it abuts the abutment surfaces 301. As such, and as can be seen by comparing FIGS. 9C and 19, the lid 204 can be opened by a greater degree when the container 200 is removed from the vehicle 10 than when the container 200 is installed in the vehicle 10.

Figure 21:
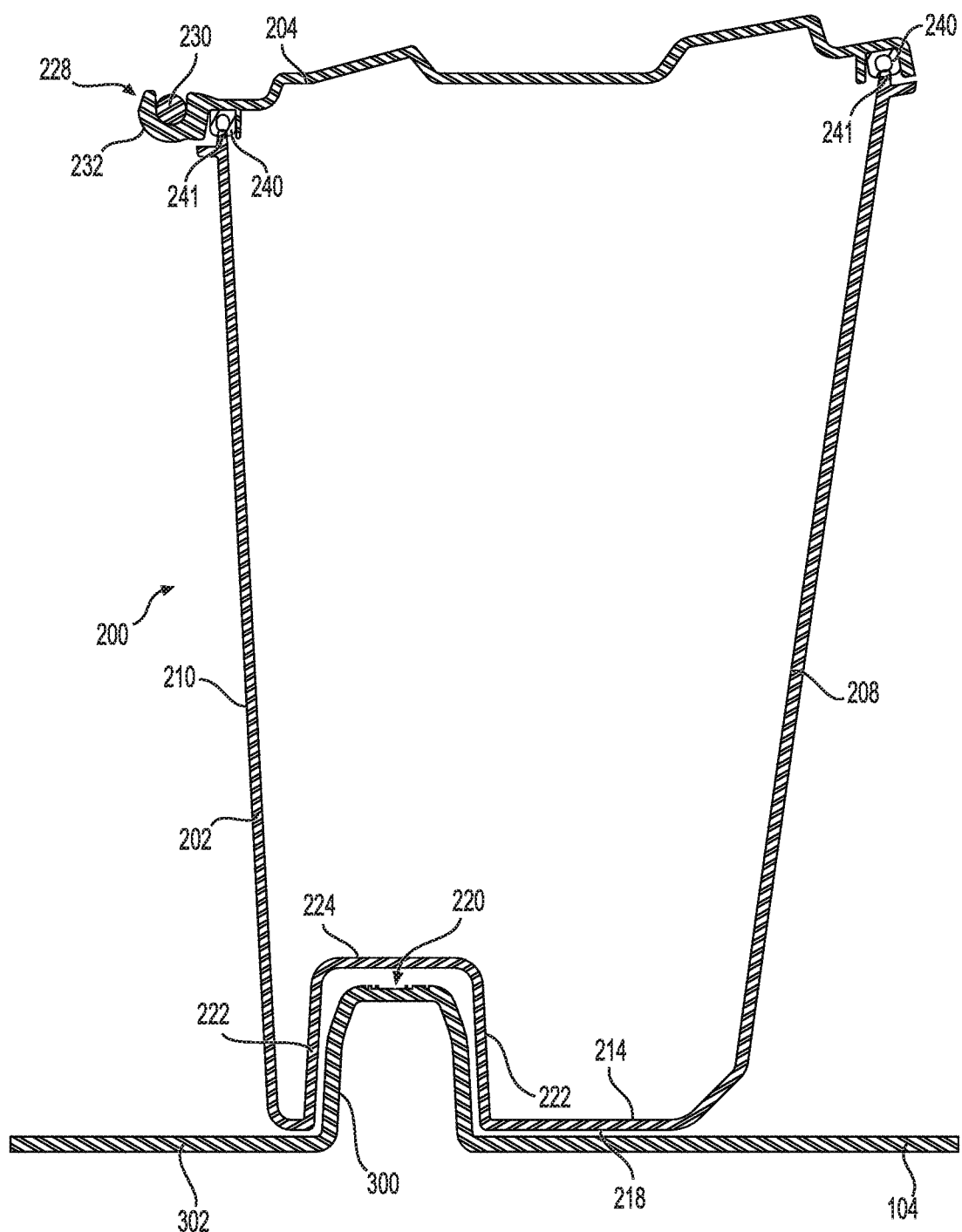
FIG. 21 is a slice of the storage container and cockpit floor taken longitudinally through the protrusion of the cockpit floor with the storage container in an installed position.

Additional details regarding the protrusion 300 and the installation/removal of the storage container 200 will now be provided with reference to FIGS. 14 to 21. As can be seen in FIG. 14 and as described above, the protrusion 300 protrudes from the cockpit floor 104. For each storage container 200, a corresponding protrusion 300 is provided. For simplicity, only the protrusion 300 and its associated components provided with respect to the front, right passenger seat 40 will be described below. The cockpit floor 104 slants slightly downward as it extends from the center of the vehicle 10 toward the side of the vehicle 10. As such, in order to provide a horizontal surface for the container 200 to rest on, the cockpit floor 104 a raised surface 302. The protrusion 300 is integrally formed with the raised surface 302 as can be seen in FIG. 21, but it is contemplated that it could be a separated component fastened or otherwise connected to the raised surface 302.

The protrusion 300 has a shape corresponding to the shape of the recess 220 of the storage container 200 (i.e. having a generally square cross-section), but is slightly smaller in order to be easily received in the recess 220. The upper end of the protrusion 300 tapers to facilitate alignment of the protrusion 300 with the recess 220 when installing the storage container 200. The position of the protrusion 300 on the cockpit floor 104 and the position of the recess 220 in the storage container body 200 determine the position of the storage container 200 in the vehicle 10 when installed. In the present embodiment, these positions locate the storage container 200 such that it is generally laterally centered with respect to its corresponding seat base 42 with the clip 206 attached to the rod 100. Having the recess 220 not disposed in the center of the bottom wall 214 of the storage container body 202 helps prevent a user from placing the storage container 200 backwards under the seat base 42 (i.e. without having the clip 206 engaging the rod 100). It is contemplated that the protrusion 300 could be located elsewhere on the cockpit floor 104, in which case the recess 220 would be moved to a position corresponding to this other position on the bottom wall 214 of the container body 202. It is contemplated that multiple protrusions 300 could be provided for each storage container 200, in which case the storage container 200 would be provided with a corresponding number of recesses 220 positioned so as to each receive a protrusion 300 therein when the storage container 200 is installed on the vehicle 10. It is also contemplated that the protrusion 300 could be replaced with multiple protrusions 300 to be received in the single recess 220 when the storage container 200 is installed on the vehicle 10. For example, the protrusion 300 illustrated in the figures could be replaced with four protrusions in the shape of rods located at positions corresponding to the four corners of the protrusion 300 illustrated in the figures. The protrusion 300 also helps to prevent the storage container 200 from moving laterally when it is installed on the vehicle 10, although small lateral displacements are possible due to the protrusion 300 being smaller than the recess 220 and since the clip 206 does not restrict lateral movement.

A height H3 (FIG. 15) of the protrusion 300 is greater than the height H1 of the passage 246 of the clip 206. When installing the storage container 200, this causes the protrusion 300 to have to be aligned and partly received in the recess 220 before the clip 206 starts engaging the rod 100. As a result, the storage container 200 is properly positioned before the clip 206 engages the rod 100, thus facilitating engagement of the rod 100 and therefore installation of the storage container 200.

Since the diameter of the rod 100 is greater than the size D1 of the open end 248 of the passage 246 defined by the clip 206, a small downward force needs to be applied in order to deform the inverted-U shaped portion 242 of the clip 206 such that the rod 100 can be received in the passage 246. As the passage 246 suddenly gets larger above the protrusion 260 located near the open end 248 of the passage 246 in the clip 206, the storage container 200 gets easier to move down once the rod 100 has passed the protrusion 260 during installation of the storage container, thus providing a form of haptic feedback to the person installing the storage container 200 that the rod 100 has been received in the clip 206. During removal of the storage container 200, the protrusion 260 provides some resistance to the removal of the rod 100 from the clip 206, providing a form of haptic feedback to the person removing the storage container 200 that the rod 100 is removed from the clip 206.

When the storage bin 200 is installed as shown in FIG. 20, the inverted-U shaped portion 242 of the clip 206 is still partially deformed. As such, since the passage 246 of the clip 206 is tapered as described above, the clip 206 applies forces at contact points P (FIG. 20) between the rod 100 and the clip 206 thus clamping the rod 100 in the clip 206. As these points P are located below the center of the rod 100, the forces applied bias the storage container 200 downward thus helping to keep the storage container 200 in position in contact with the cockpit floor 104.

By having the height H1 of the passage 246 of the clip 206 being greater than the diameter of the rod 100, the clip 206 can nonetheless engage the rod 100 at positions slightly higher or lower than illustrated. For example, the rod 100 would be located slightly lower in the passage 246 of the clip 206 should there be dirt or snow stuck between the bottom wall 214 of the storage bin 200 and the cockpit floor 104.

It is contemplated that storage containers like the storage container 200 could be installed elsewhere of the vehicle 10 and be connected to a member other than the rod 100 that could extend in a direction other than a lateral direction. The storage container 200 could be installed so as to rest elsewhere on the cockpit floor 104 or so as to rest on a storage container receiving surface other than the cockpit floor 104. One such alternative embodiment is illustrated in FIG. 22. In FIG. 22, a member in the form of a bar 350 is mounted to the top of a side wall 352 of the cargo box 56. As can be seen, the bar 350 extends longitudinally. Two storage containers 200 are mounted to the bar 350.

One storage container 200 is disposed inside the cargo box 56 and rests on the floor 354 of the cargo box 56 which acts as the storage container receiving surface. A protrusion (not shown) protrudes from the floor 354 of the cargo box 56 and is received in the recess 220 of the storage container 200. The bar 350 is received in the clip 206. The storage container 200 is installed and removed as described above except that there is no seat base 42 to hinder this installation/removal and that the storage container 200 is perpendicular to the orientation shown in FIGS. 3 and 14 to 21.

The other storage container 200 is disposed outside the cargo box 56. This storage container is only connected by the clip 206 of the storage container being disposed over the rod 350. It is contemplated that a bracket could be connected to the cargo box 56 to provide a storage container receiving surface onto which the storage container 200 can rest and a protrusion to be received in the recess of the storage container 200 when the storage container 200 is installed outside the cargo box 56 as shown.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A storage container comprising:
   a storage container body having a bottom surface and at least one side wall, the bottom surface defining a recess, the recess having a first height; and
   a clip connected to the at least one side wall, the clip defining a passage having an opened end, the opened end facing toward a bottom of the container body, the passage having a second height, the first height being greater than the second height.

2. The storage container of claim 1, further comprising a lid connected to the container body, the lid being movable between an open position permitting access to an interior of the storage container and a closed position preventing access to the interior of the storage container.

3. The storage container of claim 2, further comprising a handle connected to the lid.

4. The storage container of claim 1, wherein the clip is connected to an upper portion of the at least one side wall.

5. The storage container of claim 1, wherein the passage tapers toward the opened end thereof.

6. The storage container of claim 5, wherein the clip is deformable.

7. The storage container of claim 1, wherein the recess is eccentrically located in the bottom surface of the container body.

* * * * *